(12) United States Patent
Liu et al.

(10) Patent No.: US 12,463,781 B2
(45) Date of Patent: Nov. 4, 2025

(54) INTERLACED PHYSICAL SIDELINK FEEDBACK CHANNEL MAPPING FOR WIDEBAND SIDELINK TRANSMISSIONS

(71) Applicant: QUALCOMM Incorporated, San Diego, CA (US)

(72) Inventors: Chih-Hao Liu, San Diego, CA (US); Jing Sun, San Diego, CA (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/816,471

(22) Filed: Aug. 1, 2022

(65) Prior Publication Data
US 2024/0048329 A1  Feb. 8, 2024

(51) Int. Cl.
*H04L 5/00* (2006.01)
*H04W 72/20* (2023.01)

(52) U.S. Cl.
CPC .......... *H04L 5/0053* (2013.01); *H04W 72/20* (2023.01)

(58) Field of Classification Search
CPC .............. H04L 5/0053; H04W 72/20
See application file for complete search history.

(56) References Cited

U.S. PATENT DOCUMENTS

| | | | |
|---|---|---|---|
| 2021/0091901 A1 | 3/2021 | Sun et al. | |
| 2021/0092783 A1* | 3/2021 | Sun | H04W 76/15 |
| 2023/0148141 A1* | 5/2023 | Hu | H04W 74/0808 |
| | | | 370/329 |
| 2023/0188296 A1* | 6/2023 | Fouad | H04L 1/189 |
| | | | 370/329 |
| 2023/0232426 A1* | 7/2023 | Liu | H04B 7/0621 |
| | | | 370/330 |
| 2023/0354304 A1 | 11/2023 | Liu et al. | |

FOREIGN PATENT DOCUMENTS

WO    2022011551 A1   1/2022

OTHER PUBLICATIONS

International Search Report and Written Opinion—PCT/US2023/027854—ISA/EPO—Oct. 31, 2023.

(Continued)

*Primary Examiner* — Jackie Zuniga Abad
(74) *Attorney, Agent, or Firm* — Harrity & Harrity, LLP

(57) ABSTRACT

Systems, devices, and methods for mapping wideband sidelink (SL) resources to SL feedback resources are provided. For example, a method of wireless communication performed by a user equipment (UE) comprises: receiving, based on at least a first interlace of resource blocks (RBs) and based on two or more RB-sets of a shared frequency band, a SL communication; and transmitting, using at least a second interlace of RBs and using resources from at least one RB-set of the two or more RB-sets of the shared frequency band, a SL feedback communication for the SL communication. In some aspects, the transmitting the SL feedback communication is based on a mapping of the two or more RB-sets to the at least one RB-set.

24 Claims, 15 Drawing Sheets

(56) References Cited

OTHER PUBLICATIONS

LG Electronics: "Discussion on Physical Channel Design Framework for Sidelink on Unlicensed Spectrum", 3GPP TSG RAN WG1 #113, R1-2305631, Type Discussion, NR_SL_ENH2-CORE, 3rd Generation Partnership Project, Mobile Competence Centre, 650, Route Des Lucioles, F-06921 Sophia-Antipolis Cedex, France, vol. 3GPP RAN 1, No. Incheon, KR, May 22, 2023-May 26, 2023, May 15, 2023, 36 Pages, XP052311061, Sect. 2.2, p. 17.

Moderator (Huawei): "FL Summary#1 for AI 9.4.1.2 SL-U Physical Channel Design Framework", 3GPP TSG-RAN WG1 Meeting #112bis-e, R1-2303918, Type Discussion, NR_SL_ENH2-CORE, 3rd Generation Partnership Project, Mobile Competence Centre, 650, Route Des Lucioles, F-06921, Sophia-Antipolis Cedex, France, vol. 3GPP RAN 1, No. Online, Apr. 17, 2023-Apr. 26, 2023, Apr. 21, 2023, pp. 1-113, XP052296186, Example#1 (PSSCH-PSFCH mapping), p. 55-p. 56, Figure 3.

Moderator (Huawei): "FL Summary#4 for AI 9.4.1.2 SL-U Physical Channel Design Framework", 3GPP TSG-RAN WG1 Meeting #109-e, R1-2205241, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, May 24, 2022, pp. 1-91, XP052204065, Huawei, HiSi Proposal, p. 56, Vivo Proposal, p. 57.

\* cited by examiner

INTERLACED PHYSICAL SIDELINK FEEDBACK CHANNEL MAPPING FOR WIDEBAND SIDELINK TRANSMISSIONS

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure include schemes, mechanisms, systems, and/or devices for mapping wideband sidelink (SL) data resources to SL feedback resources. For example, a method of wireless communication may include a user equipment (UE) mapping one or more physical SL shared channel (PSSCH) resources comprising two or more resource block (RB)-sets and one or more RB interlaces to physical SL feedback channel (PSFCH) resources comprising one or more RB-sets and one or more RB interlaces. For example, the UE may map wideband PSSCH resources to in the at least one interlace and in a plurality of RB-sets to a corresponding PSFCH interlace in one or more of the plurality of RB-sets. In one aspect, the UE may map a PSSCH resource in a first plurality of RB-sets and in a first PSSCH interlace to a first PSFCH interlace also in the first plurality of RB-sets. In some aspects, the UE may duplicate a PSFCH waveform so that the PSFCH communication occupies at least some resources in all of the RB-sets associated with the PSSCH communication. Aspects of the disclosure may involve SL communications in shared or unlicensed frequency bands and during one or more channel occupancy times (COTs). In some aspects, the schemes and mechanisms described herein may allow UEs to continue wideband communications with each other during a COT and after a PSFCH occasion.

According to one aspect of the present disclosure, a method of wireless communication performed by a user equipment (UE) comprises: receiving, based on at least a first interlace of resource blocks (RBs) and based on two or more RB-sets of a shared frequency band, a SL communication; and transmitting, using at least a second interlace of RBs and using resources from at least one RB-set of the two or more RB-sets of the shared frequency band, a SL feedback communication for the SL communication, wherein the transmitting the SL feedback communication is based on a mapping of the two or more RB-sets to the at least one RB-set.

According to one aspect of the present disclosure, a user equipment (UE) comprises: a memory device; a transceiver; and a processor in communication with the memory device and the transceiver, wherein the UE is configured to: receive, based on at least a first interlace of resource blocks (RBs) and based on two or more RB-sets of a shared frequency band, a SL communication; and transmit, using at least a second interlace of RBs and using resources from at least one RB-set of the two or more RB-sets of the shared frequency band, a SL feedback communication for the SL communication, wherein the UE configured to transmit the SL feedback communication is based on a mapping of the two or more RB-sets to the at least one RB-set.

According to one aspect of the present disclosure, a non-transitory, computer-readable medium has program code recorded thereon, wherein the program code comprises instructions executable by a processor of a user equipment (UE) to cause the UE to: receive, based on at least a first interlace of resource blocks (RBs) and based on two or more RB-sets of a shared frequency band, a SL communication; and transmit, using at least a second interlace of RBs and using resources from at least one RB-set of the two or more RB-sets of the shared frequency band, a SL feedback communication for the SL communication, wherein the instructions executable by the processor of the UE to cause the UE to transmit the SL feedback communication is based on a mapping of the two or more RB-sets to the at least one RB-sets.

According to one aspect of the present disclosure, a user equipment (UE) comprises: means for receiving, based on at least a first interlace of resource blocks (RBs) and based on two or more RB-sets of a shared frequency band, a SL communication; and means for transmitting, using at least a second interlace of RBs and using resources from at least one RB-set of the two or more RB-sets of the shared frequency band, a SL feedback communication for the SL communication, wherein the means for transmitting the SL feedback communication is based on a mapping of the two or more RB-sets to the at least one RB-set.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
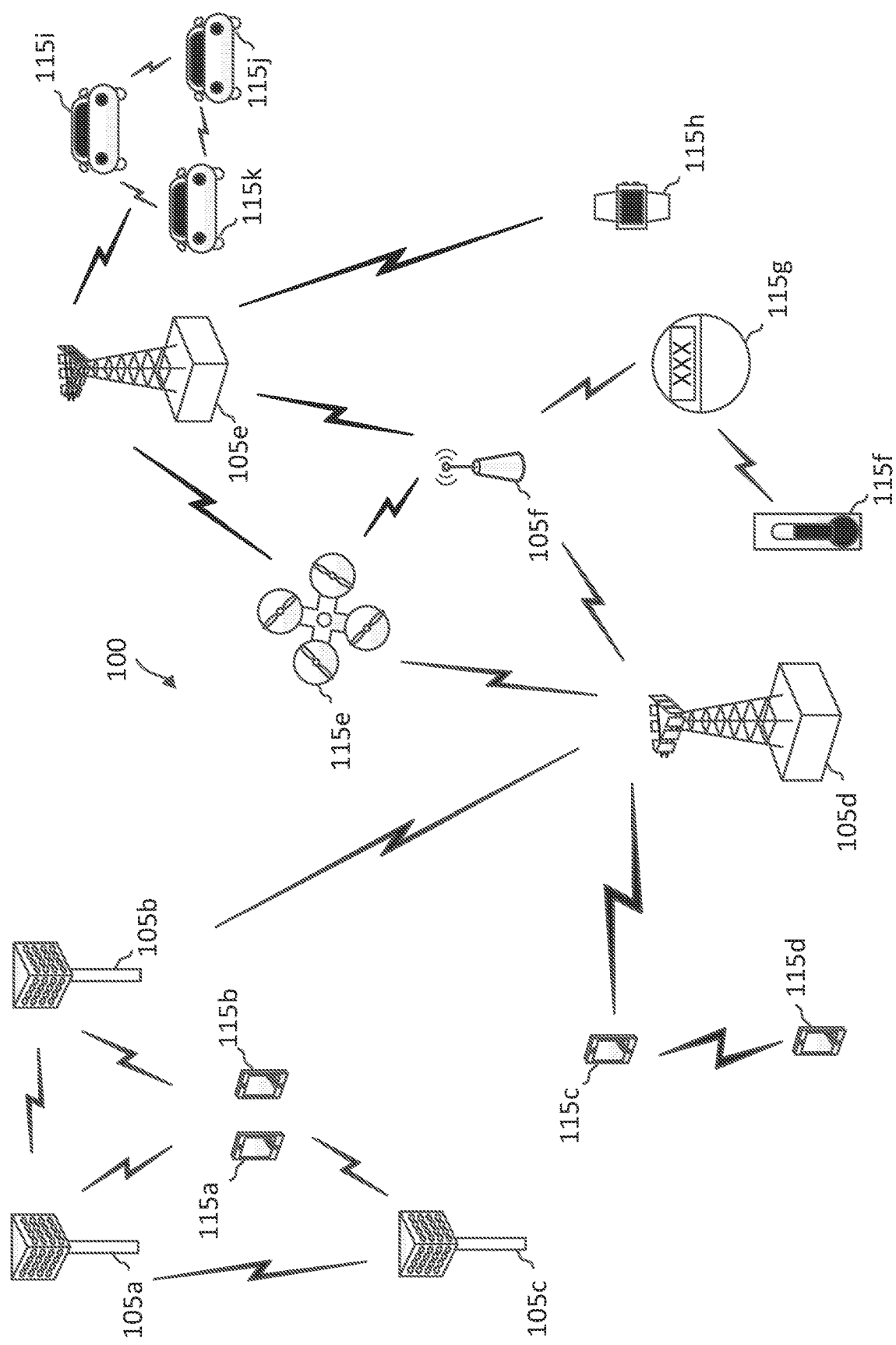
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for sidelink communications in a shared radio frequency band using frequency-interlaced waveforms. The shared radio frequency band may be part of a shared spectrum and/or an unlicensed spectrum. For example, a BS may configure a first UE with a frequency interlace resource pool for sidelink communications between the first UE and a second UE. The frequency interlace resource pool may include a plurality of frequency domain physical resource block (PRB) interlaces in the shared radio frequency band. PRBs may also be referred to as resource blocks (RBs) for the purposes of the present disclosure. Each frequency domain PRB interlace may include a set of PRBs uniformly spaced in the shared radio frequency band. Further, the frequency interlace resource pool may include and/or be associated with one or more RB-sets. In some aspects, an RB-set may refer to the available RBs in a LBT bandwidth. Each interlace may be associated with and/or located within at least one RB-set. In some aspects, each RB-set includes a plurality of interlaces of PRBs. In some instances, an RB-set may be referred to as a subband and/or band. For example, an RB-set may comprise a bandwidth of 10 MHz, 15 MHz, 20 MHz, 40 MHz, 60 MHz, 120 MHz, or other suitable bandwidth.

The sidelink communications between the first UE and the second UE may include physical sidelink shared channel (PSSCH) communications and/or physical sidelink control channel (PSCCH) communications. The PSSCH communication(s) may carry data and the PSCCH communication(s) may carry control information including transmission parameters used for transmitting the data in the PSSCH. The sidelink communications may include wideband communications. In some aspects, a wideband communication may include communications that span more than one RB-set. For example, in some aspects, a wideband SL communication may occupy resources in two, three, four, and/or any other suitable number of RB-sets.

The BS may configure the first UE to multiplex PSSCH and PSCCH on the same frequency interlace using frequency-division-multiplexing (FDM) and/or time-division-multiplexing (TDM). The second UE may be configured with physical sidelink feedback channel (PSFCH) resources for communicating a PSFCH communication, which may be referred to as a SL feedback communication in some instances. For example, in response to receiving a sidelink communication including a PSSCH communication, the second UE may utilize the sidelink feedback resources for communicating an acknowledgement/negative-acknowledgement (ACK/NACK) that the PSSCH communication was properly received and decoded (or not). In some aspects, the PSFCH communication may occupy one OFDM symbol. In some other aspects, the PSFCH communication may span more than one OFDM symbol. In some aspects, the PSFCH communication may include at least one automatic gain control (AGC) symbol carrying an AGC waveform to allow the transmitting UE to estimate or determine an AGC configuration or state.

In some aspects, the PSFCH communication may carry hybrid automatic repeat request (HARQ) ACK/NACK feedback for the sidelink communication(s). HARQ techniques may be applied to improve communication reliability and may indicate to the transmitting device whether the receiving device successfully received one or more data packets. In this regard, the first UE and the second UE may communicate PSSCH data (e.g., a PSSCH communication) using HARQ and communicate HARQ ACK/NACK feedback using an assigned frequency interlace. For instance, the first UE may transmit PSSCH data to the second UE over a sidelink. The PSSCH data may be transmitted in the form of a TB. If the second UE successfully receives and decodes the PSSCH data, the second UE may transmit a HARQ ACK (in the PSFCH communication) to the first UE using the assigned frequency interlace(s). Conversely, if the second UE fails to receive and/or decode the PSSCH data successfully, the second UE may transmit a HARQ NACK (in the PSFCH communication) to the first UE using the assigned frequency interlace(s). Upon receiving a HARQ NACK from the second UE, the first UE may retransmit the PSSCH data. Similarly, the second UE may transmit PSSCH data to the first UE using similar HARQ mechanisms. In some aspects, the HARQ ACK/NACK transmission may use one waveform sequence to indicate an ACK and another waveform sequence to indicate a NACK. In some aspects, an ACK may comprise a same computer-generated sequence as NACK, with the ACK using a first cyclic shift (CS) and the NACK using a second CS different from the first CS.

According to some aspects of the present disclosure, the sidelink feedback resources may include, similarly to the PSCCH and PSSCH resources, one or more RB-sets and/or one or more PRB interlaces within each of the one or more RB-sets. In one aspect of the present disclosure, the sidelink feedback resources may include multiple RB-sets corresponding to multiple RB-sets of a PSSCH communication. The second UE may map one or more of the PSSCH resources to one or more of the SL feedback resources. For example, the second UE may map wideband PSSCH resources in at least one interlace and in a plurality of RB-sets to a corresponding PSFCH interlace in one or more of the plurality of RB-sets. In one aspect, the second UE may map a PSSCH resource in a first plurality of RB-sets and in a first PSSCH interlace to a first PSFCH interlace also in the first plurality of RB-sets. In some aspects, the second UE may duplicate a PSFCH waveform so that the PSFCH communication occupies at least some resources in all of the RB-sets associated with the PSSCH communication.

In some aspects, the second UE may be configured with one or more PSFCH resource pools, where each pool may include one or more RB-sets. In this regard, the second UE may be configured with multiple PSFCH resource pools, where each configured PSFCH resource pool corresponds to at least one PSSCH interlace and one PSSCH RB-set. In some aspects, each PSFCH resource pool may comprise one RB-set. In this regard, the second UE may map RB-sets of a PSSCH transmission to one or more respective PSFCH resource pools. Accordingly, if a wideband PSSCH communication occupies resources in X number of RB-sets, the second UE may be configured with X number of PSFCH resource pools. In some aspects, all PSFCH resource pools may be associated with and/or based on a same interlace of RBs. For example, each of the PSFCH resource pools may be associated with an interlace used in a leading RB-set. In some aspects, the leading RB-set may be the RB-set that includes the sidelink control information format 1 (SCI-1).

In another aspect, a single PSFCH resource pool may be configured for multiple PSSCH RB-sets. The second UE may map a PSFCH resource to the RB-sets within the PSFCH resource pool that were configured for the PSSCH transmission. According to another aspect, the second UE may receive, from the first UE, an indication of a subset of RB-sets, and map the PSSCH resources and/or PSSCH communications to the indicated RB-sets. In another aspect, the second UE may apply different cyclic shift offsets, different root sequences, or a combination thereof, to duplicated PSFCH waveforms in different RB-sets.

Aspects of the present disclosure can provide several benefits. For example, the use of frequency interlaced waveforms for sidelink transmission may allow the sidelink transmission to meet a certain bandwidth occupancy requirement (e.g., a BW occupancy requirement of about 80%) of the shared radio frequency band. Additionally, the use of the frequency interlaced waveforms may allow the sidelink transmission to be transmitted at an increased power level while meeting a certain maximum allowable power spectral density (PSD) of the shared radio frequency band. Further, the use of an unlicensed spectrum for sidelink communications can offload traffic from licensed spectrums. The RB-set-based PSFCH mapping mechanisms described herein also allow for an efficient mapping of sidelink feedback communications while meeting the bandwidth occupancy requirement described above.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. In some aspects, a BS 105 may include a cohesive unit or singular network device. In another aspect, one or more of the BSs 105 may include a disaggregated BS. A disaggregated BS architecture may include one or more central units (CUs) that can communicate directly with a core network via a backhaul link, or indirectly with the core network through one or more disaggregated BS units (such as a Near-Real Time (Near-RT) RAN Intelligent Controller (RIC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 115 via one or more radio frequency (RF) access links. In some implementations, the UE 115 may be simultaneously served by multiple RUs.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2x) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide an ultra-reliable low latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. In some aspects, TXOPs may be referred to as channel occupancy times (COTs). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. Certain frequency bands may have certain BW occupancy requirements and/or a maximum allowable power spectral density (PSD). To meet BW occupancy requirements and/or boost transmit power under certain PSD limitations, sidelink transmissions in the network 100 may use a frequency-interlaced waveform. Mechanisms for sidelink communications using frequency interlaces are described in greater detail herein.

Figure 2:
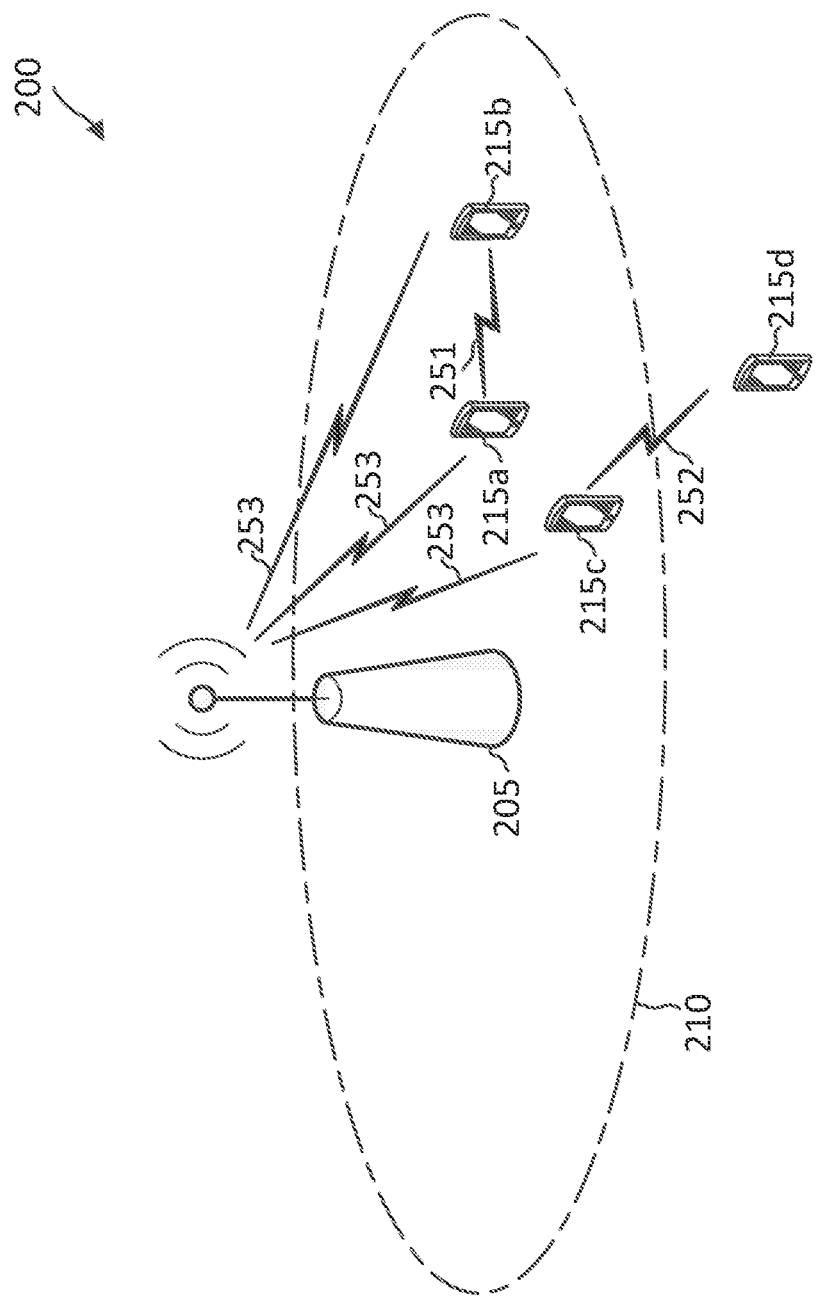
FIG. 2 illustrates a wireless communication network that provisions for sidelink communications according to some aspects of the present disclosure.

FIG. 2 illustrates an example of a wireless communication network 200 that provisions for sidelink communications according to embodiments of the present disclosure. The network 200 may be similar to the network 100. FIG. 2 illustrates one BSs 205 and four UEs 215 for purposes of simplicity of discussion, though it will be recognized that embodiments of the present disclosure may scale to any suitable number of UEs 215 and/or BSs 205 (e.g., the about 2, 3, 6, 7, 8, or more). The BS 205 and the UEs 215 may be similar to the BSs 105 and the UEs 115, respectively. The BSs 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another sidelink 252. The sidelinks 251 and 252 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d is outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

In some aspects, the network 200 may be a LTE network. The transmissions by the UE 215a and the UE 215b over the sidelink 251 and/or the transmissions by the UE 215c and the UE 215d over the sidelink 252 may reuse a LTE PUSCH waveform, which is a discrete Fourier transform-spreading (DFT-s) based waveform. In some aspects, the network 200 may be an NR network. The transmissions by the UEs 215 over the sidelinks 251 and/or 252 may use a cyclic-prefix-OFDM (CP-OFDM) waveform.

Figure 3:
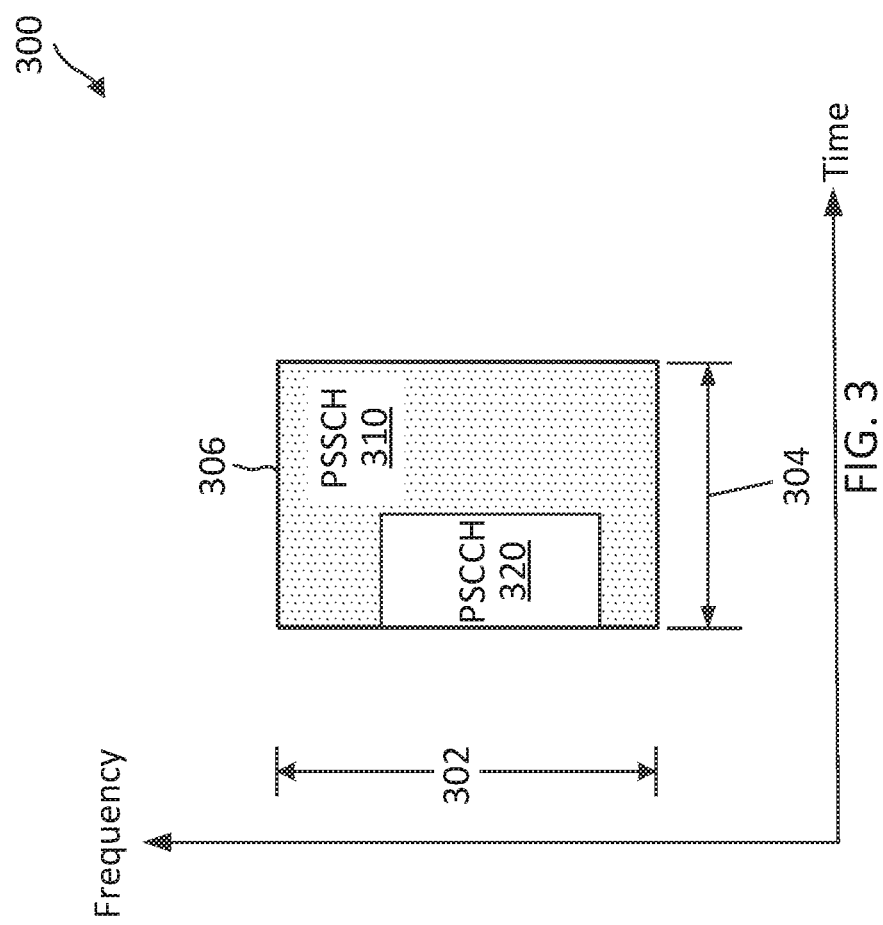
FIG. 3 illustrates a sidelink communication scheme according to some aspects of the present disclosure.

FIG. 3 illustrates a sidelink communication scheme 300 according to some aspects of the present disclosure. The scheme 300 may be employed by BSs such as the BSs 105 and 205 and UEs such as the UEs 115 and 215 in a network such as the network 100. In some instances, the network may be an NR network. In FIG. 3, the x-axis represents time in some arbitrary units, and the y-axis represents frequency in some arbitrary units. In the scheme 300, a BS (e.g., the BSs 105 and/or 205) may configure a UE (e.g., the UEs 115 and/or 215) with resources 306 in the frequency band 302 during the time period 304 for sidelink communications with another UE. The sidelink communications may include PSSCH communication 310 and PSCCH communication 320. The PSSCH communications 310 may include data. The PSCCH communications 320 may include control information associated with the transmissions of the PSCCH communications 310. The PSSCH communications 310 may be substantially similar to PDCCH communications between a BS and a UE. While there may not be a CORESET defined for the PSCCH communication 310 as in the PDCCH communication, a UE may be required to perform monitoring and blind decoding to receive the PSCCH communication 310. The resources 306 may be in the form of resource blocks. As shown, the PSCCH communications 320 is embedded within the PSSCH communication 310. In some instances, the PSCCH communications 320 and the PSSCH communication 310 may use a CP-OFDM waveform for transmissions.

The scheme 300 may be suitable when the sidelink communication is over a licensed band. For sidelink communication over a shared radio frequency band or unlicensed band, the sidelink communication may be required to satisfy certain power spectral density (PSD) requirements and/or occupancy channel bandwidth (OCB) requirements.

Accordingly, the present disclosure provides techniques for sidelink communications over an unlicensed band using frequency-interlaced waveforms to meet OCB requirements and allow for a higher total transmit power without exceeding a certain PSD limitation.

Figure 4:
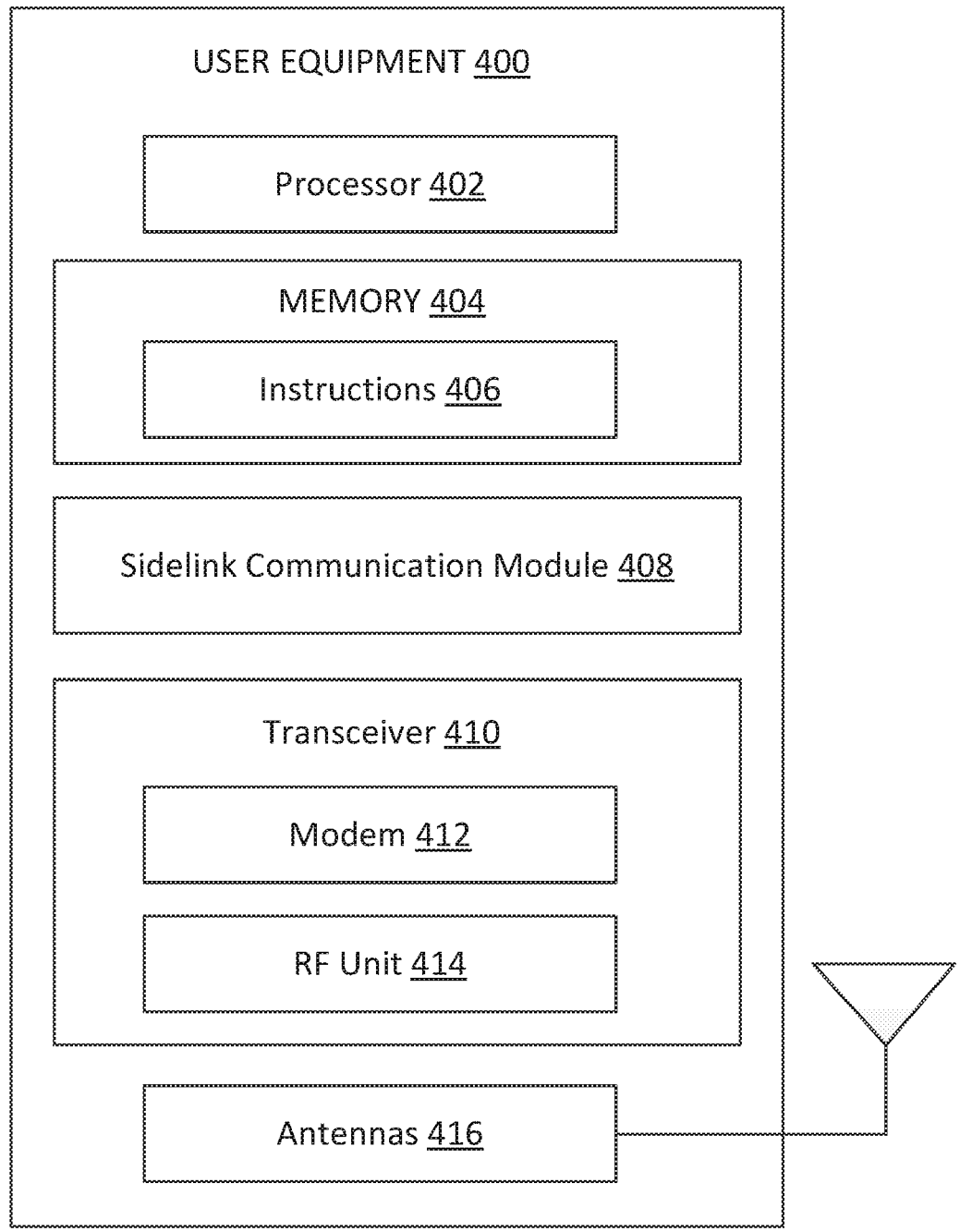
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an sidelink communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 9A-11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 408 may be implemented via hardware, software, or combinations thereof. For example, the sidelink communication module 408 may be implemented as a processor, circuit, and/or instructions 406 stored in the memory 404 and executed by the processor 402. In some instances, the sidelink communication module 408 can be integrated within the modem subsystem 412. For example, the sidelink communication module 408 can be implemented by a combination of software components (e.g., executed by a DSP or a general processor) and hardware components (e.g., logic gates and circuitry) within the modem subsystem 412.

The sidelink communication module 408 may be used for various aspects of the present disclosure, for example, aspects of FIGS. 9A-11. The sidelink communication module 408 may be configured to receive a sidelink resource configuration from a BS (e.g., the BSs 105 and/or 205) for sidelink communication and communicate sidelink data (e.g., PSSCH data), sidelink control information (e.g., PSSCH control information), and/or sidelink feedback (e.g., PSFCH information) with another UE based on the sidelink resource configuration. The sidelink resource configuration may indicate a pool of frequency domain PRB interlaces in a frequency band. In some aspects, the sidelink resource configuration may indicate one or more RB-sets associated with one or more frequency subbands. For example, an RB-set may span approximately 10 MHz, 15 MHz, 20 MHz, or any other suitable bandwidth in the shared frequency band. In some aspects, the frequency interlaces and/or the RB-sets may be configured individually or separately for PSSCH communications and for PSFCH communications. In other aspects, the PSFCH resources indicated in the configuration may share one or more RB-sets and/or one or more interlaces of PRBs with the PSSCH resources.

The configuration may further indicate a mapping scheme or protocol for mapping PSSCH communications to PSFCH resources. For example, the sidelink communication module 408 may be configured to receive one or more wideband PSSCH communications in two or more RB-sets and in one or more first interlaces. The sidelink communication module 408 may be configured to map the PSSCH resources of a wideband PSSCH communication to one or more PSFCH interlaces in one or more RB-sets based on the mapping. In some aspects, the mapping may be a one-to-one mapping such that a PSSCH communication is mapped to the same RB-sets and a same PSFCH interlace in the RB-sets corresponding to the PSSCH interlace. In another aspect, the mapping may include a mapping to one or more cyclic shift pair sets, as further explained below. The mapping may be based on a slot index associated with each PSSCH communication. In another aspect, the sidelink communication module may be configured to hash within a CS pair set based on at least one of an identifier of the transmitting UE or a groupcast identifier associated with the PSSCH communications. Additional details regarding the mapping and communication of PSSCH and PSFCH communications will be described below with respect to FIGS. 9A-11.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the sidelink communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data, PSCCH control information, and/or PSFCH data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., the frequency interlace configuration, PSSCH data, PSCCH control information, and/or PSFCH information) to the sidelink communication module 408 for processing. The antennas 416 may include multiple antennas of similar or different designs in order to sustain multiple transmission links. The RF unit 414 may configure the antennas 416.

In an example, the transceiver 410 is configured to receive a frequency interlace configuration from a BS (e.g., the BSs 105 and 205) indicating frequency-interlaced resources for sidelink communication, transmit PSSCH data, PSCCH control information, and/or feedbacks (e.g., HARQ ACK/NACK and/or channel measurement reports) to another UE, and/or receive PSSCH data, PSCCH control information, and/or feedbacks from another UE, for example, by coordinating with the sidelink communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
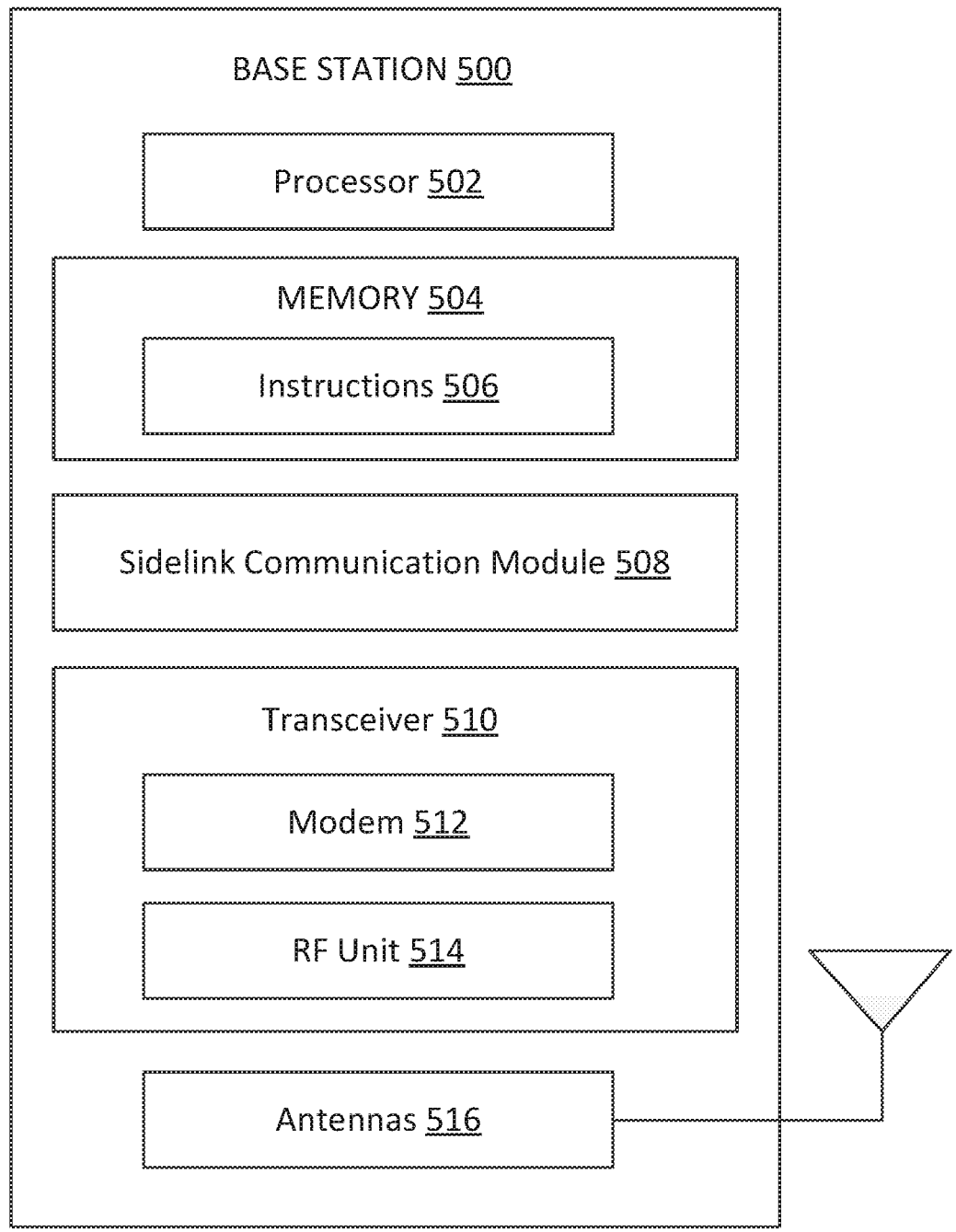
FIG. 5 is a block diagram of an exemplary base station (BS) according to some aspects of the present disclosure.

FIG. 5 is a block diagram of an exemplary Network Unit 500 according to some aspects of the present disclosure. The Network Unit 500 may be a BS 105 in the network 100 as discussed above in FIG. 1. The BS may be an aggregated BS or a disaggregated BS, for instance. In other aspects, the Network Unit 500 may comprise a centralized unit (CU), a distributed unit (DU), radio unit (RU), and/or any other suitable type of network node, network entity, or network device. A shown, the Network Unit 500 may include a processor 502, a memory 504, an sidelink communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 9A-11. Instructions 506 may also be referred to as code, which may be interpreted broadly to include any type of computer-readable statement(s) as discussed above with respect to FIG. 4.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 9A-11. The sidelink communication module 508 may be configured to transmit a sidelink resource configuration to one or more sidelink UEs for sidelink communication and communicate sidelink data (e.g., PSSCH data), sidelink control information (e.g., PSSCH control information), and/or sidelink feedback (e.g., PSFCH information) with another UE based on the sidelink resource configuration. The sidelink resource configuration may indicate a pool of frequency domain PRB interlaces in a frequency band. In some aspects, the sidelink resource configuration may indicate one or more RB-sets associated with one or more frequency subbands. For example, an RB-set may span approximately 20 MHz in the shared frequency band. In some aspects, an RB-set may be referred to as a frequency subband. In some aspects, the frequency interlaces and/or the RB-sets may be configured individually or separately for PSSCH communications and for PSFCH communications. In other aspects, the PSFCH resources indicated in the configuration may share one or more RB-sets and/or one or more interlaces of PRBs with the PSSCH resources.

The configuration may further indicate a mapping scheme or protocol for mapping PSSCH communications to PSFCH resources. For example, the configuration may include a configuration for mapping wideband PSSCH communications to one or more PSFCH interlaces in one or more RB-sets based on the mapping. In some aspects, the mapping may be a one-to-one mapping such that a PSSCH communication is mapped to a same RB-set and a same PSFCH interlace in one or more RB-sets corresponding to the PSSCH interlace. In another aspect, the mapping may include a mapping to one or more cyclic shift pair sets, as further explained below. The mapping may be based on a slot index associated with each PSSCH communication. In another aspect, the sidelink communication module may be configured to hash within a CS pair set based on at least one of an identifier of the transmitting UE or a groupcast identifier associated with the PSSCH communications. Additional details regarding the mapping and communication of PSSCH and PSFCH communications will be described below with respect to FIGS. 9A-11.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., uplink control information (UCI), demodulation reference signal (DMRS)) to the sidelink communication module 508 for processing. The antennas

516 may include multiple antennas of similar or different designs in order to sustain multiple transmission links.

In an example, the transceiver 510 is configured to transmit a resource configuration to a UE (e.g., the UEs 115 and 400) indicating a frequency interlace and receive a UL control channel signal (e.g., a PUCCH signal) modulated by HARQ ACK/NACK and SR from the UE in the frequency interlace, for example, by coordinating with the sidelink communication module 508.

In an aspect, the Network Unit 500 can include multiple transceivers 510 implementing different RATs (e.g., NR and LTE). In an aspect, the Network Unit 500 can include a single transceiver 510 implementing multiple RATs (e.g., NR and LTE). In an aspect, the transceiver 510 can include various components, where different combinations of components can implement different RATs.

Figure 6:
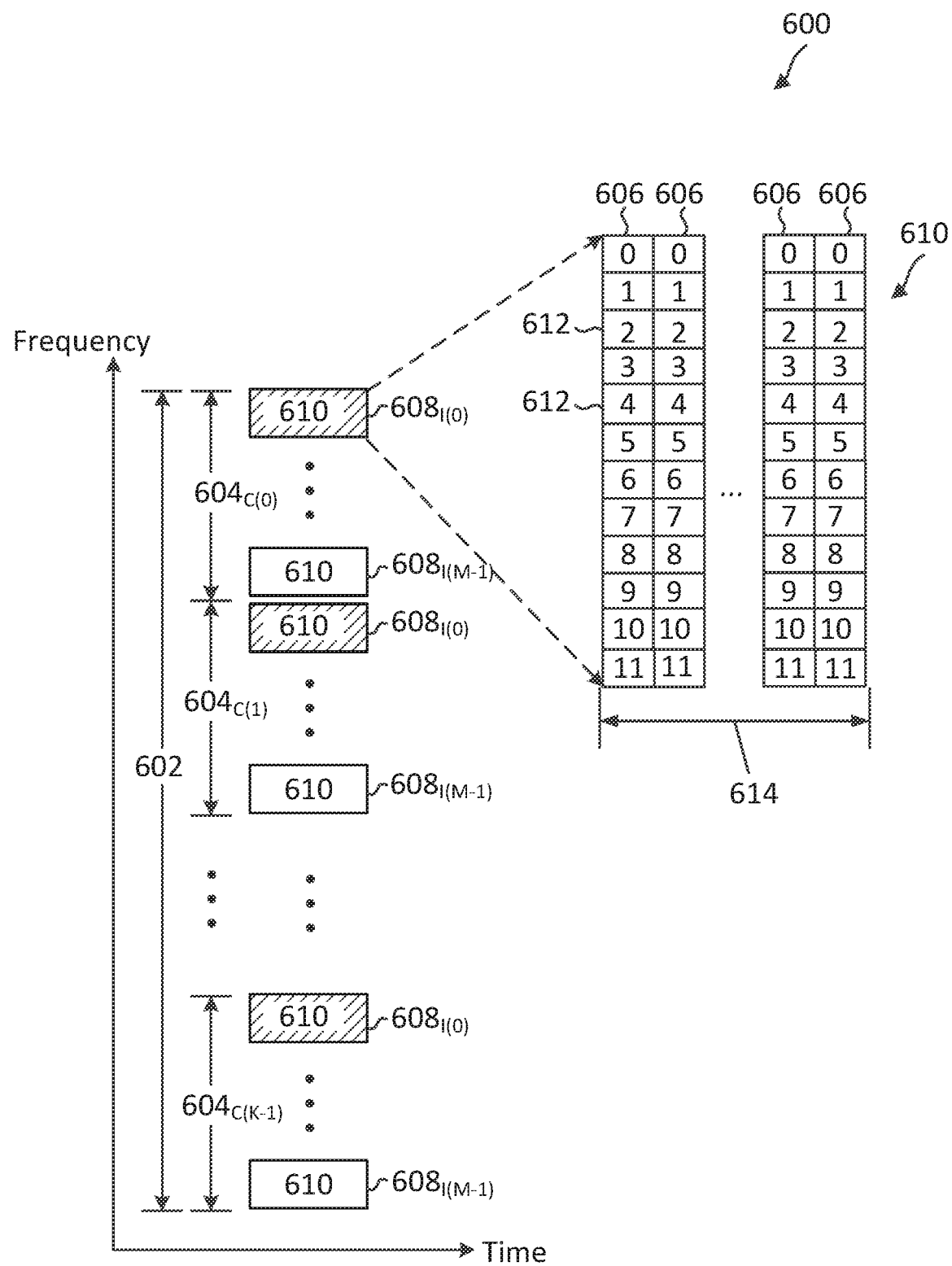
FIG. 6 illustrates a sidelink communication scheme using a frequency-interlaced waveform according to some aspects of the present disclosure.

FIG. 6 illustrates a sidelink communication scheme 600 using a frequency-interlaced waveform according to some aspects of the present disclosure. The scheme 600 may be employed by BSs such as the BSs 105 and/or network units (e.g., network unit 500) and UEs such as the UEs 115 and 400 to communicate over a frequency band 602, which may be a shared radio frequency band or an unlicensed band. In FIG. 6, the x-axis represents time in some arbitrary units, and the y-axis represents frequency in some arbitrary units. The frequency band 602 may, for example, have a bandwidth of about 10 megahertz (MHz) or about 20 MHz and a subcarrier spacing (SCS) of about 15 kilohertz (kHz), about 30 kHz, or about 20 kHz. The frequency band 602 may be located at any suitable frequencies. In some aspects, the frequency band 602 may be located at about 3.5 GHz, 6 GHz, or 60 GHz. The scheme 600 allocates resources for sidelink communications (e.g., over the sidelinks 251 and 252) between UEs (e.g., the UEs 115 and 400) in units of frequency interlaces 608.

The frequency interlaces are shown as $608_{I(0)}$ to $608_{(M-1)}$, where M is a positive integer. Each frequency interlace $608_{I(i)}$ may include K plurality of RBs 610 evenly spaced over the frequency band 602, where K is a positive integer and i may vary between 0 to M−1. In other words, the RBs 610 in a particular frequency interlace $608_{I(i)}$ are spaced apart from each other by at least one other RB 610. The frequency interlace $608_{I(0)}$ as shown comprises RBs 610 from clusters $604_{C(0)}$ to $604_{C(K-1)}$. The values of K and M may vary based on several factors, such as the bandwidth, the SCS, and/or the PSD limitation of the frequency band 602, as described in greater detail herein. In an example, a BS (e.g., the BSs 105) may assign the frequency interlace $608_{I(0)}$ for sidelink communications between a pair of UEs (e.g., the UEs 115) and may assign the frequency interlace $608_{I(1)}$ for sidelink communications between another pair of UEs. The allocation of the frequency interlace $608_{I(0)}$ are shown as patterned boxes. In some other examples, the BS may assign multiple frequency interlaces 608 (e.g., frequency interlaces $608_{I(0)}$ and $608_{I(1)}$) for sidelink communications between a pair of UEs.

A group of M localized RBs 610 forms a cluster 604. As shown, the frequency interlaces $608_{I(0)}$ to $608_{(M-1)}$ form K clusters $604_{C(0)}$ to $604_{C(K-1)}$. Each RB 610 may span about twelve contiguous subcarriers 612 in frequency and a time period 614. The subcarriers 612 are indexed from 0 to 11. The subcarriers 612 are also referred to as resource elements (REs). The time period 614 may span any suitable number of OFDM symbols 606. In some aspects, the time period 614 may correspond to one transmission time interval (TTI), which may include about fourteen OFDM symbols 606.

The number of clusters 604 or the value of K may be dependent on the amount of frequency distribution required to maintain a certain BW occupancy. As an example, the scheme 600 may divide the frequency band 602 into about ten clusters 604 (e.g., K=10) and distribute an allocation over the ten clusters 604 to increase a frequency occupancy of the allocation. In an aspect, the frequency band 602 may have a bandwidth of about 20 MHz and each subcarrier 612 may span about 15 kHz in frequency. In such an aspect, the frequency band 602 may include about ten frequency interlaces 608 (e.g., M=10). For example, an allocation may include one frequency interlace 608 having ten distributed or equally spaced RBs 610. Compared to an allocation with a single RB or ten localized RBs, the interlaced allocation with the ten distributed RBs 610 allows a UE to transmit with a higher BW occupancy.

In another aspect, the frequency band 602 may have a bandwidth of about 10 MHz and each subcarrier 612 may span about 15 kHz in frequency. In such an aspect, the frequency band 602 may include about five frequency interlaces 608 (e.g., M=5). Similarly, an allocation may include one frequency interlace 608 having ten distributed RBs 610. The interlaced allocation with the ten distributed RBs may allow for a wider BW occupancy than an allocation with a single RB or ten localized RBs.

In another aspect, the frequency band 602 may have a bandwidth of about 20 MHz and each subcarrier 612 may span about 30 kHz in frequency. In such an aspect, the frequency band 602 may include about five frequency interlaces 608 (e.g., M=5). Similarly, an allocation may include one frequency interlace 608 having ten distributed RBs 610. The interlaced allocation with the ten distributed RBs may allow for a wider BW occupancy than an allocation with a single RB or ten localized RBs.

In some aspects, the RBs 610 are physical resource blocks (PRBs) and each frequency interlace 608 may include PRBs uniformly spaced in the frequency band 602.

In the scheme 600, sidelink communications over an assigned frequency interlace 608 (e.g., the frequency interlace $608_{I(0)}$) may include PSSCH communications (e.g., the PSSCH communication 310) and PSCCH communication (e.g., the PSCCH communication 320). Thus, in the scheme 600, sidelink transmissions may have a frequency-interlaced waveform. Since the frequency band 602 is a shared radio frequency band or an unlicensed band, a UE is required to perform an LBT prior to transmitting in an assigned frequency interlace 608. When the LBT is a pass, the UE may proceed to transmit PSSCH data and/or PSCCH control information to another UE using the assigned frequency interlace 608. The PSSCH control information may be transmitted in the form of SCI, which may be substantially similar to the PDCCH DCI transmitted by a BS to a UE. When the LBT fails, the UE may refrain from transmitting in the assigned frequency interlace. To reduce LBT delay, the scheme 600 may configure the UE to multiplex PSSCH and PSCCH in the same frequency interlace 608.

Figure 7:
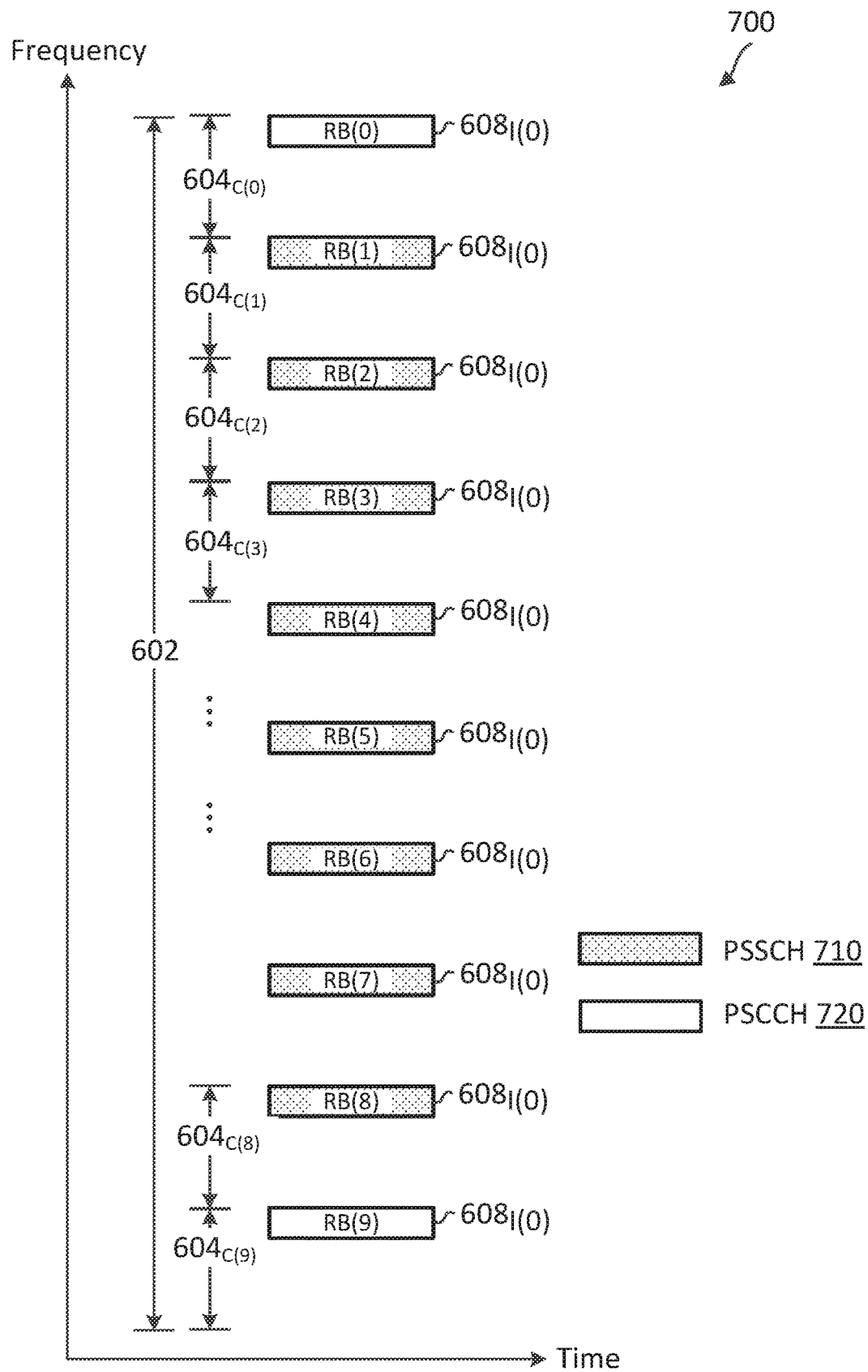
FIG. 7 illustrates a sidelink communication scheme using a frequency-interlaced waveform according to some aspects of the present disclosure.
Figure 8:
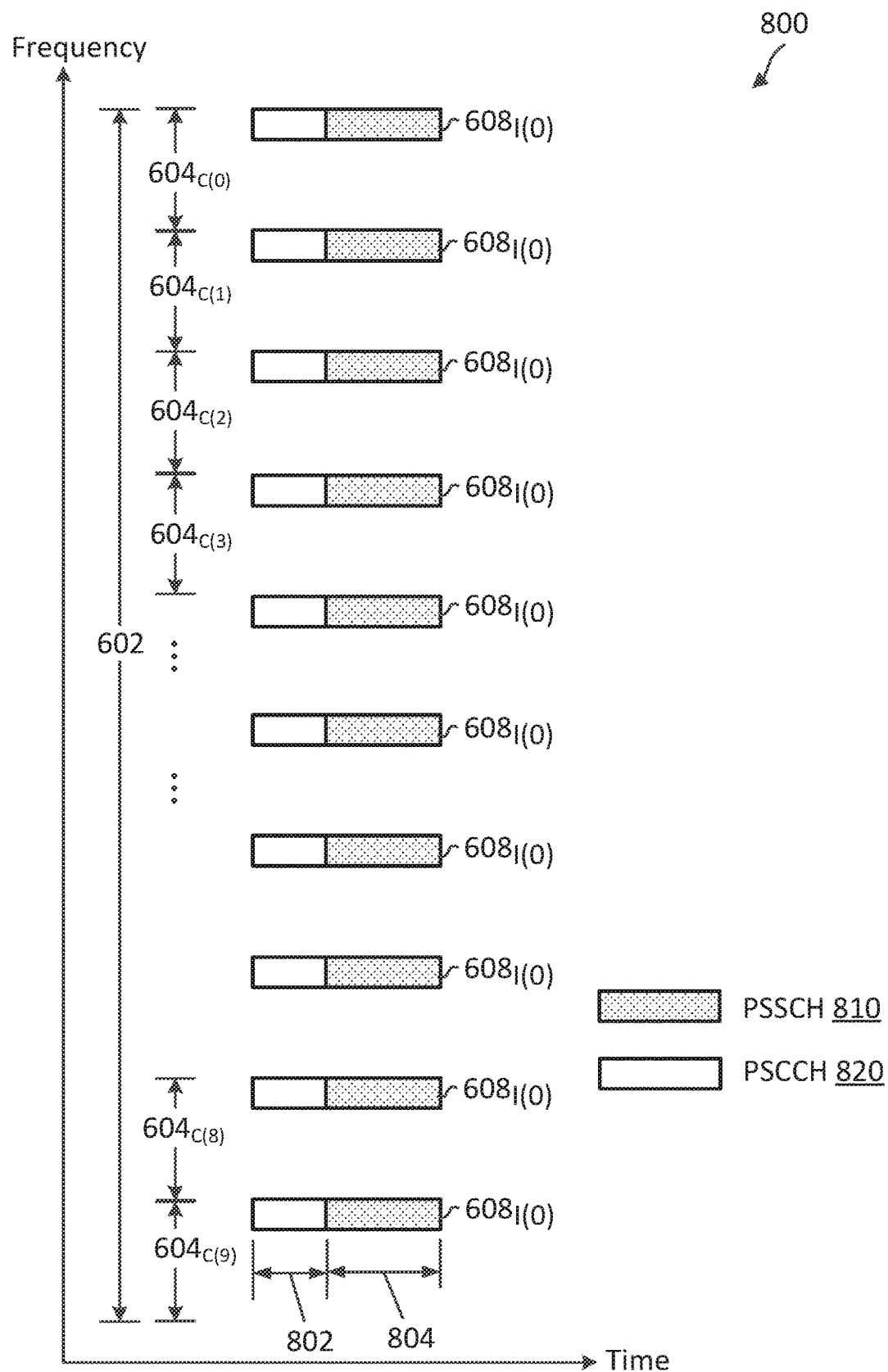
FIG. 8 illustrates a sidelink communication scheme using a frequency-interlaced waveform according to some aspects of the present disclosure.

FIGS. 7-8 illustrate various mechanisms for multiplexing a PSSCH signal (e.g., the PSSCH communication 310) and a PSCCH signal (e.g., the PSCCH communication 320) on the same frequency interlace (e.g., the frequency interlace $608_{I(0)}$). In FIGS. 7 and 8, the schemes 700 and 800 may be employed by a BS such as the BSs 105, 205, and/or 500 and a UE such as the UEs 115, 215, and/or 400 in a network such as the networks 100 and/or 200. In particular, the BS may configure the UE with a frequency interlace for sidelink communication and a multiplexing configuration for multiplexing PSSCH communication (e.g., the PSSCH communication 310) and PSCCH communication (e.g., the PSCCH communication 320). Additionally, FIGS. 7-8 are described using a similar frequency-interlaced resource structure as in the scheme 600, and may use the same reference numerals as in FIG. 6 for simplicity sake.

FIG. 7 illustrates a sidelink communication scheme 700 using a frequency-interlaced waveform according to some aspects of the present disclosure. The scheme 700 multiplexes PSSCH communication 710 and PSCCH communication 720 on the same frequency interlace $608_{I(0)}$ using FDM. The PSSCH communication 710 is similar to the PSSCH communication 310. The PSCCH communication 720 is similar to the PSCCH communication 320. For purposes of simplicity of discussion, FIG. 7 illustrates an example for a 10 MHz BW (e.g., the frequency band 602) with 15 kHz SCS and ten clusters 604 (e.g., K=10). Thus, the frequency interlace $608_{I(0)}$ may include ten RBs (e.g., the RBs 610). However, the scheme 700 may be applied to a frequency interlace with any suitable number of RBs 610 and/or any SCS. The RBs in the frequency interlace $608_{I(0)}$ are shown as RB(0) to RB(9).

In the scheme 700, a BS (e.g., the BSs 105, 205, and/or 500) may configure a first UE (e.g., the UEs 115, 215, and/or 400) with a frequency interlace 608 in the frequency band 602 for sidelink communication with a second UE (e.g., the UEs 115, 215, and/or 400) over a sidelink (e.g., the sidelinks 251 and/or 252). For example, in the illustrated example of FIG. 7, the BS configures the first UE with the frequency interlace $608_{I(0)}$ for sidelink communication with the second UE. The BS may configure the first UE with a FDM configuration for multiplexing the PSSCH communication 710 and the PSCCH communication 720 on the frequency interlace $608_{I(0)}$.

To provide a maximum frequency diversity for the PSCCH communication 720, the BS may configure the PSCCH communication 720 to be at the two ends of the frequency interlace $608_{I(0)}$. In other words, the BS may configure a highest-frequency RB (e.g., the RB(0)) and a lowest-frequency RB (e.g., the RB(9)) for the PSCCH communication 720. The PSSCH communication 710 may use the remaining RBs (e.g., the RB(1) to RB(8)) in the frequency interlace $608_{I(0)}$.

The PSSCH communication 710 may include data and the PSCCH communication 720 may include control information associated with the transmission of the data.

In some aspects, the transmission of the PSSCH communication 710 and the PSCCH communication 720 may use a CP-OFDM waveform over the frequency interlace $608_{I(0)}$. In this regard, the first UE and/or the second UE may generate a CP-OFDM transmission signal by mapping encoded PSSCH control information and the encoded PSSCH data onto subcarriers (e.g., the subcarriers 612) of corresponding RBs of the frequency interlace $608_{I(0)}$ and performing an inverse fast Fourier transform (IFFT).

FIG. 8 illustrates a sidelink communication scheme 800 using a frequency-interlaced waveform according to some aspects of the present disclosure. The scheme 800 multiplexes PSSCH communication 810 and PSCCH communication 820 on the same frequency interlace $608_{I(0)}$ using TDM. The PSSCH communication 810 is similar to the PSSCH communications 310 and 710. The PSCCH communication 820 is similar to the PSCCH communications 320 and 720.

In the scheme 800, a BS (e.g., the BSs 105, 205, and/or 500) may configure a first UE (e.g., the UEs 115, 215, and/or 400) with the frequency interlace $608_{I(0)}$ for sidelink communication with a second UE (e.g., the UEs 115, 215, and/or 400) over a sidelink (e.g., the sidelinks 251 and/or 252). The BS may configure the first UE with a TDM configuration for multiplexing the PSSCH communication 810 and the PSCCH communication 820 on the frequency interlace $608_{I(0)}$. The BS may configure a time period 802 for the PSCCH communication 820 and another time period 804 for the PSSCH communication 810. The time period 804 may be adjacent to the time period 802 to reduce LBT delay (e.g., a single LBT may be performed before the time period 802 for the transmission of the PSCCH communication 820 and the PSSCH communication 810). In some instances, the time period 804 for the PSSCH communication 810 may include a greater number of symbols (e.g., the symbols 606) than the time period 802 for the PSCCH communication 820. In some instances, the time period 802 may include about 1-2 OFDM symbols and the time period 804 may include 10-11 symbols. In some instances, the length of the time period 802 for the PSCCH communication 820 may be predetermined. The first UE may transmit SCI in the PSCCH communication 820 during the time period 802 to the second UE, and the second UE may perform blind decoding in the time period 802 to receive the SCI.

While the PSSCH communication 810 and the PSCCH communication 820 are communicated during different time periods, each PSSCH communication 810, the PSCCH communication 820 may include an interlaced waveform. In some aspects, the transmission of the PSSCH communication 810 and the PSCCH communication 820 may use a DFT-s-OFDM waveform over the frequency interlace $608_{I(0)}$. In this regard, the first UE and/or the second UE may generate a DFT-s-OFDM transmission signal for transmission during the time period 802 by performing a DFT on the encode PSSCH control information, mapping the DFT output onto subcarriers (e.g., the subcarriers 612) of the RBs in the frequency interlace $608_{I(0)}$, and performing an IFFT. Similarly, the first UE and/or the second UE may generate a DFT-s-OFDM transmission signal for transmission during the time period 804 by performing a DFT on the encode PSSCH data, mapping the DFT output onto subcarriers of the RBs in the frequency interlace $608_{I(0)}$, and performing an IFFT. The DFT-s-OFDM based waveform transmission in the scheme 800 may provide a lower peak-to-average-power-ratio (PAPR) than the CP-OFDM based waveform transmission in the scheme 700.

A UE may be configured with sidelink feedback resources for communicating an acknowledgement/non-acknowledgement that the PSSCH communication was received. For example, the UE may be configured with physical sidelink feedback channel (PSFCH) resources for communicating the SL feedback communication. In some aspects, the PSFCH communication may span about one OFDM symbol. In some other aspects, the PSFCH communication may span more than one OFDM symbol. In some aspects, the PSFCH communication may include at least one symbol for automatic gain control (AGC).

In some aspects, the PSFCH communication may carry HARQ ACK/NACK feedbacks. As described above, HARQ techniques may be applied to improve communication reliability. In this regard, a first UE and a second UE may communicate PSSCH data (e.g., the PSSCH communications) using HARQ and communicate HARQ ACK/NACK feedback using an assigned frequency interlace. For instance, the first UE may transmit PSSCH data to the second UE over a sidelink interface. The PSSCH data packet may be transmitted in the form of a TB. If the second UE receives PSSCH data successfully, the second UE may transmit a HARQ ACK (in the PSFCH communication) to the first UE using the at least one assigned frequency interlace. Conversely, if the second UE fails to receive the PSSCH data successfully, the second UE may transmit a HARQ NACK (in the PSFCH communication) to the first UE using the assigned frequency interlace. Upon receiving a HARQ NACK from the second UE, the first UE may retransmit the PSSCH data. Similarly, the second UE may transmit PSSCH data to the first UE using similar HARQ mechanisms. In some aspects, the HARQ ACK/NACK transmission may use one waveform sequence to indicate an ACK and another waveform sequence to indicate a NACK.

In some instances, a plurality of PSFCH communications are transmitted simultaneously, where each PSFCH communication corresponds to a respective PSSCH communication. For example, in some aspects, each PSFCH communication may correspond to a respective PSSCH TB. Accordingly, the second UE transmitting the PSFCH communications may map each PSSCH communication to a respective PSFCH resource. The present disclosure describes schemes and mechanisms for mapping, hashing, multiplexing, and communicating PSFCH communications using interlaced PSFCH waveforms. In some aspects, the PSFCH resources may include, or be defined in terms of, RB-sets, interlaces, and/or cyclic shift (CS) pairs. For example, aspects of the present disclosure may include mapping one or more PSSCH communications based on their associated RB-set, interlace, and/or slot to one or more corresponding PSFCH resources in one or more RB-sets, interlaces, CS pair sets, and/or CS pairs. Further aspects of the present disclosure include hashing PSFCH communications in a plurality of CS pairs.

Figure 9A:
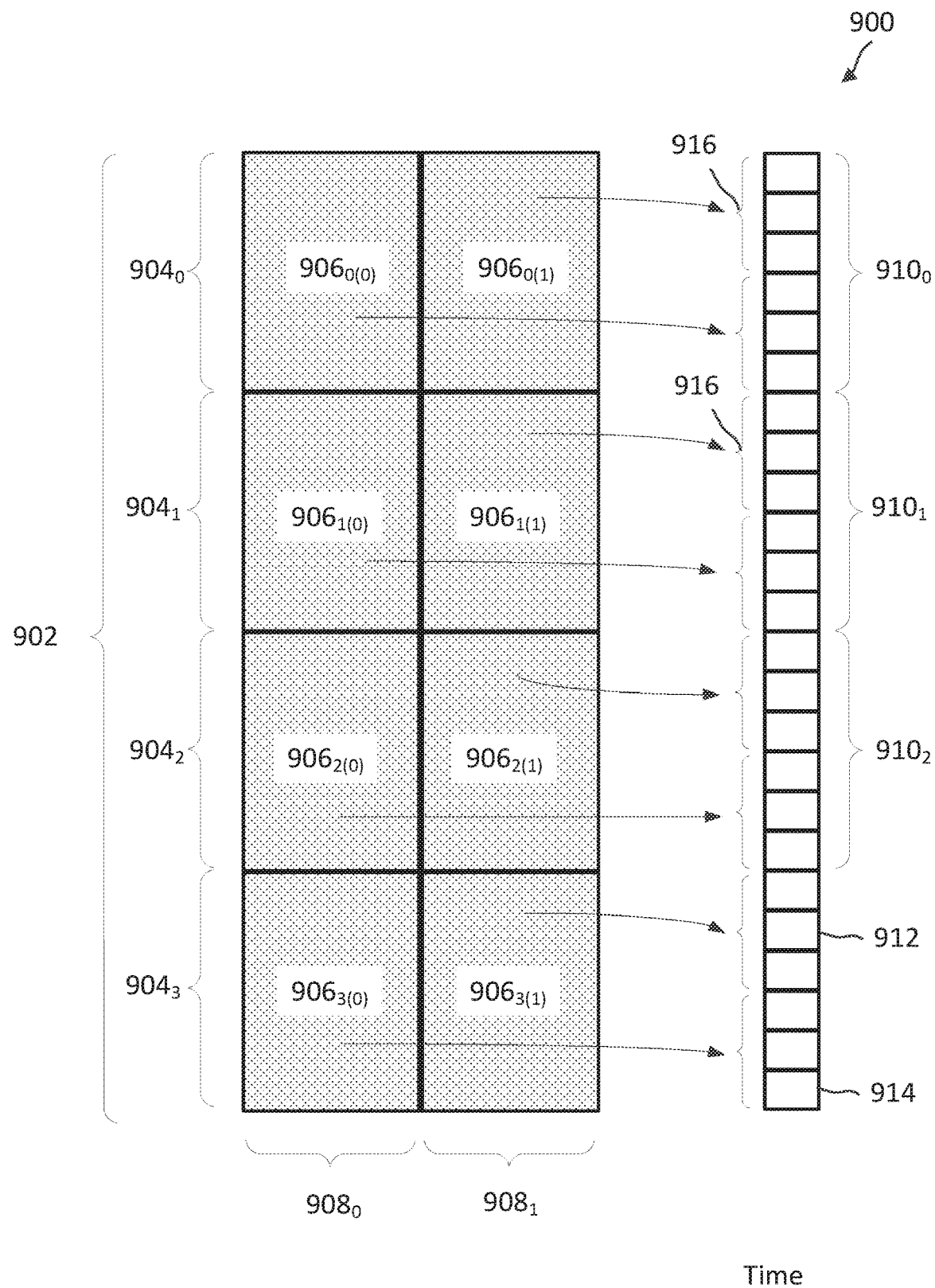
FIG. 9A illustrates a sidelink communication scheme for mapping interlaced sidelink communications to interlaced sidelink feedback resources according to some aspects of the present disclosure.
Figure 9B:
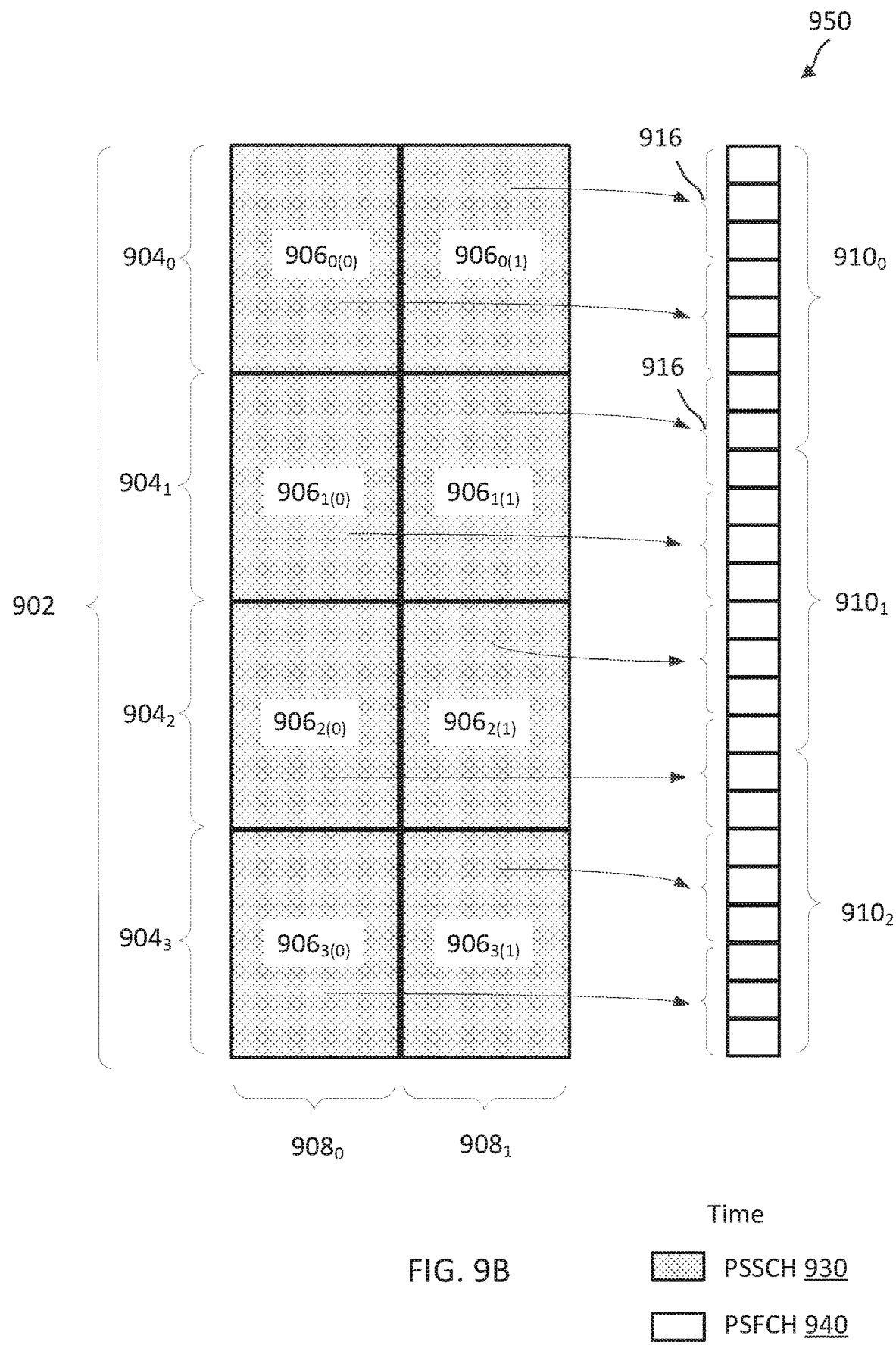
FIG. 9B illustrates a sidelink communication scheme for mapping interlaced sidelink communications to interlaced sidelink feedback resources according to some aspects of the present disclosure.

FIGS. 9A and 9B are diagrams illustrating schemes for mapping PSSCH communications to PSFCH resources. In some aspects, a first UE may communicate, with a second UE, a plurality of PSSCH communications $906_{i(j)}$. For example, in some aspects, the first UE may communicate a plurality of TBs carrying PSSCH data in corresponding PSSCH resources 930. The PSSCH resources 930 include a plurality of interlaces $904_i$ in one or more RB-sets 902. Although a single RB-set 902 is shown in FIGS. 9A and 9B, it will be understood that the PSSCH communications $906_{i(j)}$ may span more than one RB-set, such as two RB-sets, three RB-sets, four RB-sets, eight RB-sets, and/or any other suitable number of RB-sets. In some aspects, each PSSCH communication $906_{i(j)}$ may correspond to one of a plurality of interlaces of RBs $904_i$. The interlaces $904_i$ are illustrated as logical interlaces. Each interlace $904_i$ of RBs may include a plurality of RBs spaced from each other by at least one other RB in the RB-set 902. In the illustrated examples, the RB-set 902 includes four PSSCH interlaces $904_i$ of RBs. The PSFCH resources 940 may correspond to the same RB-set 902. In other aspects, the PSFCH resources 940 may include one or more other RB-sets instead of or in addition to the PSSCH RB-set 902.

Referring to the scheme 900 of FIG. 9A, the RB-set 902 includes four PSSCH interlaces $904_i$ of RBs. A plurality of PSSCH communications $906_{i(j)}$ are distributed among the interlaces $904_i$ and in a first slot $908_0$ and a second slot $908_1$. Accordingly, each PSSCH communication $906_{i(j)}$ corresponds to an interlace i and a slot j. In this regard, the suffixes provided for each PSSCH communication $906_{i(j)}$ in FIGS. 9A and 9B may indicate both of the interlace index i and the slot index j. For example, the PSSCH communication $906_{2(0)}$ may correspond to interlace index 2 and slot index 0. The scheme 900 also includes a plurality of PSFCH resources 940 including four PSFCH interlaces $910_k$ distributed within the RB-set 902. In this regard, the PSFCH resources 940 may use the same RB-set 902 used for the PSSCH resources 930. In other aspects, the PSFCH resources 940 may use a different RB-set or RB-set configuration than the PSSCH resources 930. The PSFCH resources 940 include the same number of interlaces $910_k$ as the PSSCH resources 930 in the scheme 900. Accordingly, the scheme 900 may include mapping the PSSCH communications 906 from one PSSCH interlace $904_i$ in the RB-set 902 to a corresponding PSFCH interlace $910_k$ in the RB-set 902. In some aspects, the PSSCH communications $906_{i(j)}$ may span more than interlace 904 and/or more than one RB-set 902. Accordingly, in some aspects, the scheme 900 may include mapping the PSSCH communications $906_{i(j)}$ from one set of RB-sets 902 to a corresponding set of RB-sets of the PSFCH resources 940. In some aspects, the PSSCH communications $906_{i(j)}$ may span a plurality of RB-sets and the scheme 900 may include mapping the PSSCH communications $906_{i(j)}$ from the plurality of RB-sets to PSFCH resources within a first RB-set of the plurality of RB-sets. In another aspect, the scheme 900 may include mapping the PSSCH communications 906 spanning the plurality of RB-sets to the same plurality of RB-sets within the PSFCH resources 940. In another aspect, the scheme 900 may include mapping the PSSCH communications $906_{i(j)}$ from one set of PSSCH interlaces to a corresponding set of PSFCH interlaces. In some aspects, each PSSCH interlace $904_i$ may be associated with an interlace index i and each PSFCH interlace $910_k$ may be associated with an interlace index k. In some aspects, the indexes of the PSSCH interlaces $904_i$ may be the same as the indexes of the PSFCH interlaces $910_k$. In other aspects, of the indexes of the PSSCH interlaces may be different from the indexes of the PSFCH interlaces. In other aspects, a single set of interlace indexes may be used for both of the PSSCH resources 930 and the PSFCH resources 940.

In one aspect, the PSSCH communications $906_{i(j)}$ are mapped to the PSFCH resources 940 based on the RB-set 902 and the interlace $904_i$. For example, the PSSCH communications $906_{0(0)}$ and $906_{0(1)}$ map to the PSFCH interlace $910_0$ in the RB-set 902. In the example of FIG. 9A in which the PSFCH resources 940 include the same number of logical interlaces 910 within an RB-set 902, the PSSCH communications 906 may be mapped to the PSFCH resources 940 further based on the slot index $908_j$. In this regard, each PSFCH interlace $910_k$ may include a plurality of cyclic shift (CS) pair sets 916, with each CS pair set comprising one or more CS pairs. For example, the CS pairs include the CS pairs 912, 914. The PSSCH communications $906_{i(j)}$ may be mapped to one or more CS pairs in the PSFCH resources 940. In some aspects, the mapping of the PSSCH communications $906_{i(j)}$ is based on the slot index of the PSSCH communications $906_{i(j)}$. In some aspects, the size of CS pair sets 916 in an interlace may be determined or defined based on the following equation:

$$N_{CS-set}^{PSFCH} = \left( \frac{\text{\# of available CS pairs within the mapped interlace}(s)}{\text{\# of PSSCH slots within one PSFCH period}} \right) \quad (1)$$

In some aspects, the mapping may include a one-to-one mapping from the PSSCH interlace and slot index to the corresponding PSFCH interlace and a corresponding CS pair set within the PSFCH period. In one aspect, the PSSCH leading RB-set and interlace may be the interlace and RB-set which carry or include the SCI-1 scheduling the PSSCH communication. If the PSSCH resources 930 include the same number of RB-sets and the same number of interlaces as the PSFCH resources 940, the mapping may include a one-to-one mapping between the PSSCH interlace and RB-set, and the PSFCH interlace in the same RB-set. In one example, the UE may map a leading PSSCH interlace and one or more RB-sets to a corresponding PSFCH interlace in the one or more RB-sets. In another example, the UE may map a set of PSSCH interlaces and one or more RB-sets to a corresponding set of PSFCH interlaces in the one or more RB-sets. In another example, the UE may map a leading PSSCH interlace and a leading RB-set to a corresponding PSFCH interlace and a corresponding RB-set.

In some aspects, the number of PSFCH interlaces within an RB-set may be smaller than the number of PSSCH interlaces. For example, referring to FIG. 9B, the scheme 950 includes PSSCH resources 930 having four interlaces 904 within the RB-set 902. The PSFCH resources 940 include three interlaces 910 within the RB-set 902. Accordingly, in the scheme 950, the UE may partition a total number of CS pairs in the PSFCH resources 940 and map the PSSCH communications 906 based on a leading PSSCH interlace to a corresponding partitioned CS pair set. In this regard, although the number of PSFCH interlaces may be smaller than or otherwise different than the number of PSSCH interlaces, the UE may map a PSSCH leading RB-set or RB-sets to a corresponding PSFCH RB-set or RB-sets. In some aspects, the size of a partitioned CS pair set may be determined or defined based on the following equation:

$$N_{CS-set}^{PSFCH} = \left( \frac{\text{\# of available } CS \text{ pairs within one interlace} \times \text{\# of } PF0 \text{ } PSFCH \text{ interlaces}}{\text{\# of } PSSCH \text{ slots within one } PSFCH \text{ period} \times \text{\# of } PSSCH \text{ interlaces in one } RB\text{-}set} \right) \times N_{type}^{PSFCH} \quad (2)$$

Where $N_{type}^{PSFCH}$ may be:

1, or $N_{interlaces}^{PSSCH}$, or $N_{interlaces}^{PSSCH} \times N_{RBset}^{PSSCH}$, or $N_{RBset}^{PSSCH}$ In some aspects, $N_{RBset}^{PSSCH}$ is the number of RB-sets that the corresponding PSSCH occupies. In some aspects, $N_{interlaces}^{PSSCH}$ is the number of interlaces that the PSSCH occupies. In some aspects, the choice of $N_{type}^{PSFCH}$ is based on whether all of the PSFCH resources 940 are used in the PSSCH occupied interlaces and RB-sets.

According to another aspect of the present disclosure, a UE may hash within associated CS pair sets 916 based on the transmitting UE's identifier (ID) and/or on the groupcast ID associated with the PSSCH communication. For example, in some aspects, a receiving UE may hash within an associated CS pair set based on the transmitting UE's L1 ID and groupcast ID of the PSSCH communication. In some aspects, the hashing may be based on the formula below:

$(P_{ID} + M_{ID}) \bmod N_{CS-set}^{PSFCH}$ \quad (3)

Where $P_{ID}$ and $M_{ID}$ are the transmitting UE's ID and the groupcast ID, respectively.

In some aspects, the PSFCH period may be 0, 1, 2, 4, and/or any other suitable period. In some aspects, there may be 2, 3, 4, 6, and/or any other suitable number of CS pairs within an interlace of RBs. In this regard, FIGS. 9A and 9B show the PSFCH resources 940 having three CS pairs in each CS pair set, with six CS pairs in each PSFCH interlace 910. In other words, in the examples of FIGS. 9A and 9B, the PSFCH resources 940 may be described as having a value for $N_{CS-set}^{PSFCH} = 3$. Accordingly, the UE may map a PSSCH from the first slot to a first CS pair set in the interlace and a PSSCH from a second slot to a second CS pair set in the interlace. Within each CS pair set, the UE may has based on the transmitting UE's ID and groupcast ID, as explained above.

In some aspects, a UE may receive a wideband SL communication occupying resources in more than one RB-set. In some aspects, an RB-set may be referred to as a frequency subband. In one example, a frequency subband may have a bandwidth of 20 MHz. Accordingly, in some instances, a wideband SL communication may occupy resources in a SL resource pool having a bandwidth of 40 MHz, 60 MHz, 80 MHz, etc. For example, in some aspects, a PSSCH communication may be associated with an interlace of RBs within two or more RB-sets. The UE may receive the wideband SL communication during a COT, and may transmit ACK/NACK in PSFCH resources in the same COT. In some aspects, the COT may be continued for the COT-initiating UE in the RB-sets in which the ACK/NACK is transmitted. However, in some aspects, the COT may terminate in the RB-sets in which PSSCH was transmitted but PSFCH was not transmitted. It may be desirable or beneficial to transmit a PSFCH waveform in more than one RB-set of the RB-sets in which the PSSCH was transmitted, so that the COT may be continued for some or all of the PSSCH RB-sets. In another aspect, it may be beneficial or desirable for the PSSCH transmitting UE to continue the COT in only a subset of the PSSCH RB-sets.

Figure 10A:
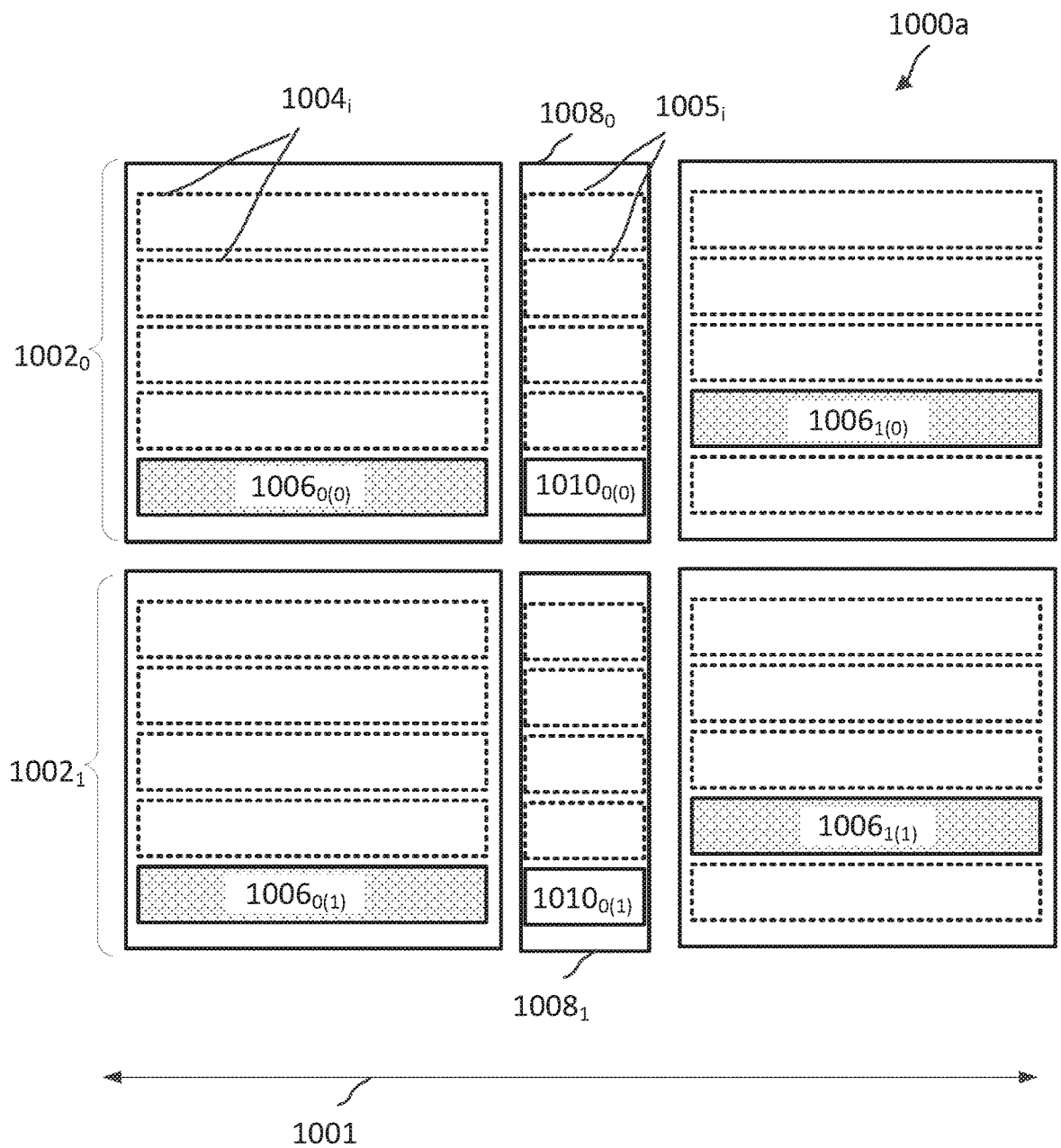
FIG. 10A illustrates a sidelink communication scheme for mapping wideband interlaced sidelink communications to interlaced sidelink feedback resources according to some aspects of the present disclosure.
Figure 10B:
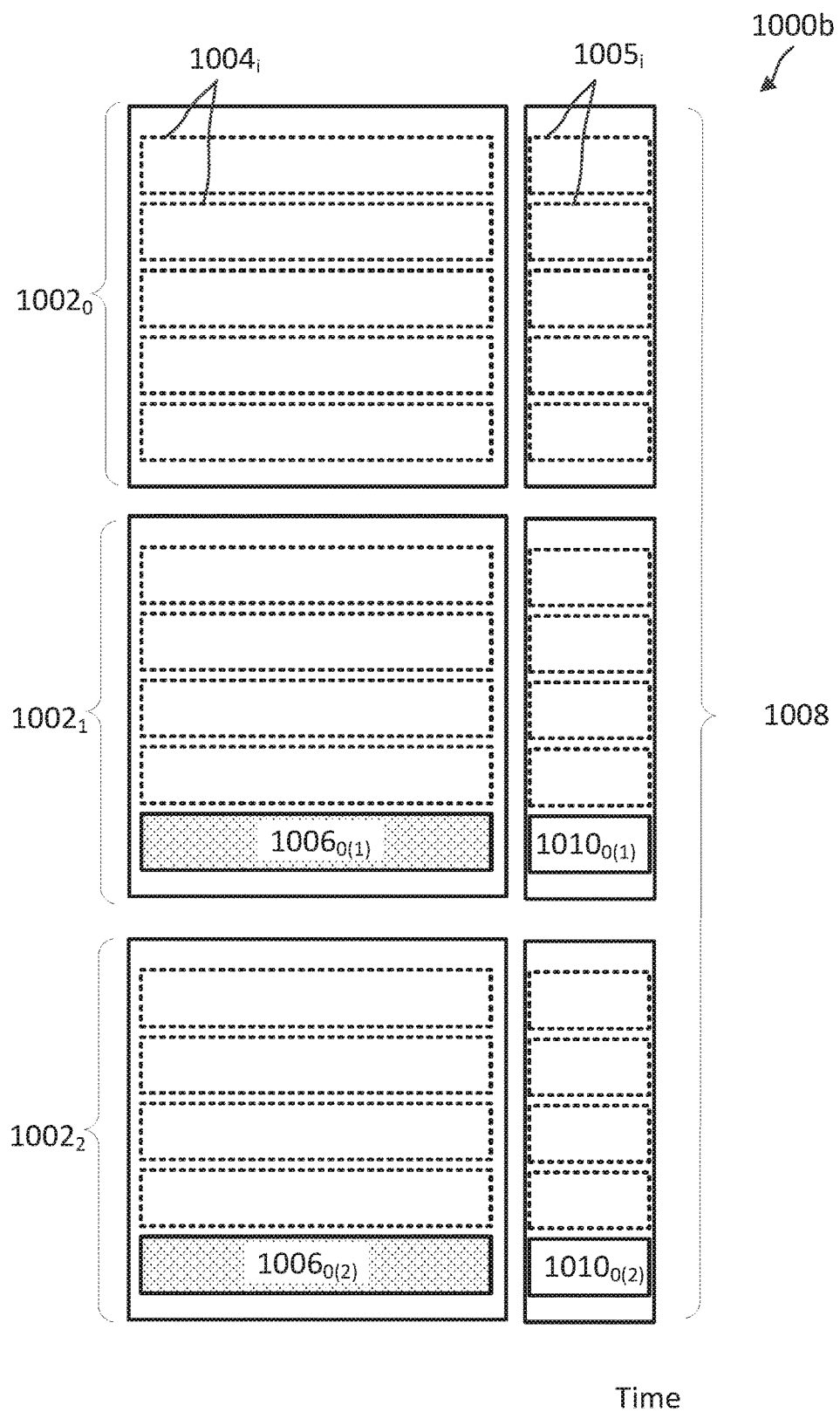
FIG. 10B illustrates a sidelink communication scheme for mapping wideband interlaced sidelink communications to interlaced sidelink feedback resources according to some aspects of the present disclosure.
Figure 10C:
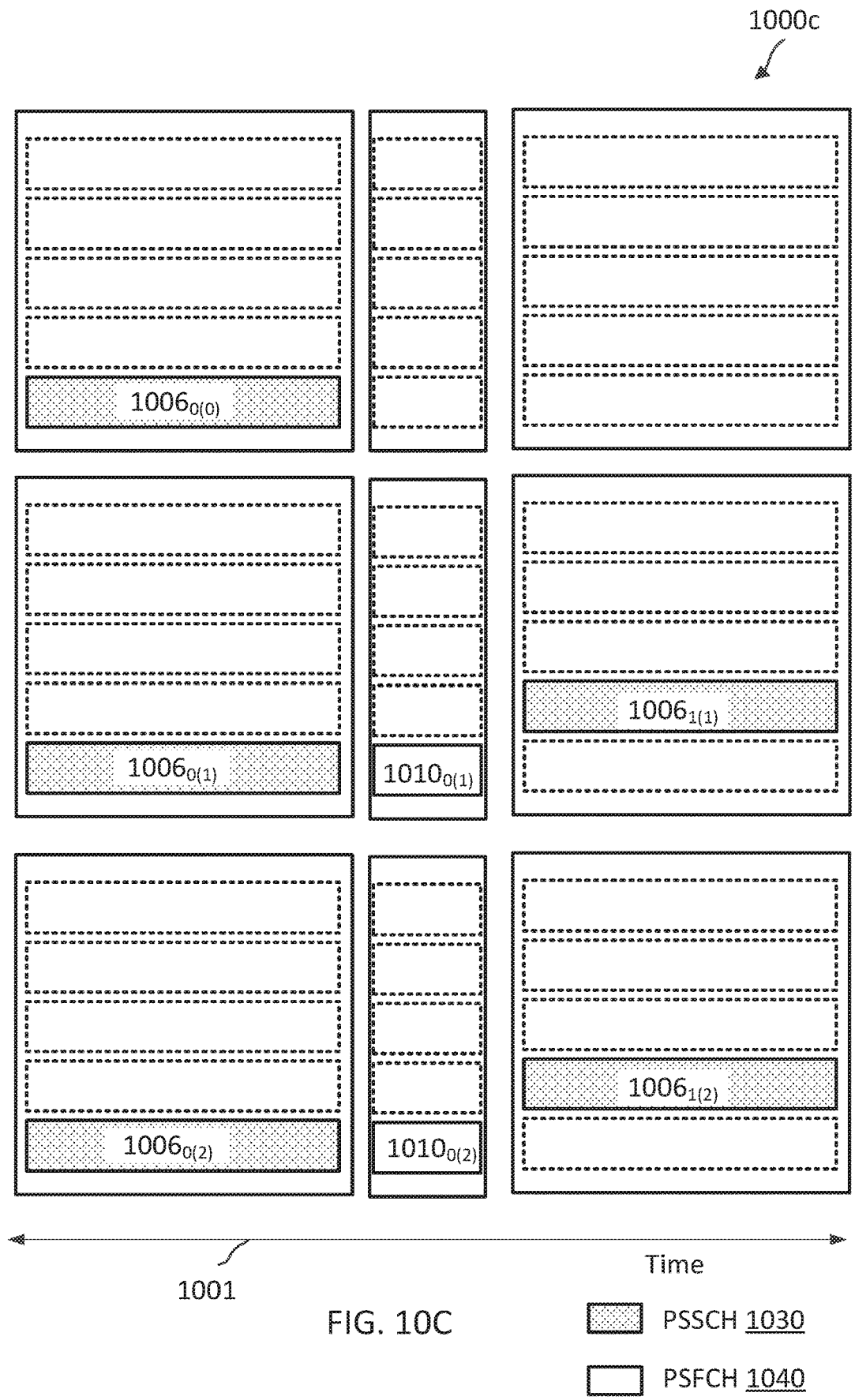
FIG. 10C illustrates a sidelink communication scheme for mapping wideband interlaced sidelink communications to interlaced sidelink feedback resources according to some aspects of the present disclosure.

FIGS. 10A-10C illustrate various SL communication schemes for mapping wideband SL communications to PSFCH resources, according to aspects of the present disclosure. For example, the aspects of FIGS. 10A-10C may illustrate schemes for mapping SL resources for wideband PSSCH communications to wideband PSFCH resources. In some aspects, the schemes illustrated in FIGS. 10A-10C may involve or include schemes for indicating one or more RB-sets and/or one or more interlaces of RBs for PSFCH communications associated with one or more wideband PSSCH communications.

In some aspects, the first UE may communicate a plurality of TBs carrying PSSCH data in corresponding PSSCH resources 1030. The PSSCH resources 1030 include a plurality of interlaces $1004_i$ in one or more RB-sets $1002_k$. Although two RB-sets $1002_k$ are shown in FIG. 10A, it will be understood that the PSSCH resources 1030 may span more than two RB-sets, such as three RB-sets, four RB-sets, eight RB-sets, and/or any other suitable number of RB-sets. In some aspects, each PSSCH communication $1106_{i(k)}$ may correspond to one of a plurality of interlaces of RBs $1004_i$. The interlaces $1004_i$ are illustrated as logical interlaces. Each interlace $1004_i$ of RBs may include a plurality of RBs spaced from each other by at least one other RB in the RB-sets $1002_k$. In the illustrated examples, each of the RB-sets $1002_k$ includes five PSSCH interlaces $1004_i$ of RBs. The PSFCH resources 1040 may correspond to the same RB-sets $1002_k$. In other aspects, the PSFCH resources 1040 may include one or more other RB-sets instead of or in addition to the PSSCH RB-sets $1002_k$.

Referring to the scheme 1000a of FIG. 10A, each RB-set $1002_k$ includes five PSSCH interlaces $1004_i$ of RBs. A wideband PSSCH communication occupies PSSCH resources 1006 in at least the interlace $1004_0$ and in the first RB-set $1002_0$ and the second RB-set $1002_1$. Accordingly, the PSSCH communication corresponds to at least interlace i (0) and RB-sets k (0, 1). In this regard, the suffixes provided for each PSSCH resource $1006_{i(k)}$ in FIGS. 10A and 10B may indicate both of the interlace index i and the RB-set index k. For example, the PSSCH resource $1006_{2(0)}$ may correspond to interlace index 2 and RB-set index 0. The scheme $1000a$ also includes a plurality of PSFCH resources $1010_{i(k)}$ including four PSFCH interlaces $1005_i$ distributed within the RB-sets $1002_k$. In this regard, the PSFCH resources $1010_{i(k)}$ may use the same interlaces $1005_i$ and/or the same RB-sets $1002_k$ used for the PSSCH resources $1006_{i(k)}$. In other aspects, the PSFCH resources 1040 may use a different RB-set or RB-set configuration than the PSSCH resources 1030. The PSFCH resources $1010_{i(k)}$ include the same number of interlaces $1005_i$ as the PSSCH resources $1006_{i(k)}$. Accordingly, the scheme $1000a$ may include mapping the PSSCH resources $1006_{i(k)}$ from one PSSCH interlace $1004_i$ in the RB-set 1002 to a corresponding PSFCH interlace $1005_i$ in the RB-sets $1002_k$. In some aspects, the PSSCH resources $1006_{i(k)}$ may span more than interlace $1004_i$. Accordingly, in some aspects, the scheme $1000a$ may include mapping the PSSCH communications $1006_{i(k)}$ from one set of RB-sets $1002_k$ of the PSSCH resources 1030 to a corresponding set of RB-sets of the PSFCH resources 1040. In some aspects, the PSSCH communications $1006_{i(k)}$ may span a plurality of RB-sets and the scheme $1000a$ may include mapping the PSSCH communications $1006_{i(k)}$ from the plurality of RB-sets $1002_k$ to PSFCH resources within a subset or all of the RB sets $1002_k$ in the PSFCH resources 1040.

In the scheme $1000a$, a transmitting UE transmits a wideband PSSCH communication in the PSSCH resources $1006_{i(k)}$ to a receiving UE such that the PSSCH communication occupies resources in at least one interlace $1004_0$ and in at least the first RB-set $1002_0$ and the second RB-set $1002_1$. The transmission may occur during a COT 1001. The COT 1001 may be initiated by the transmitting UE, in some aspects. In other aspects, the COT 1001 may be initiated by the receiving UE. In some aspects, the COT-initiating UE may initiate the COT by performing a channel access procedure. For example, the COT-initiating UE may perform a type 1 channel access procedure, such as a CAT4 LBT. The COT 1001 may have a duration that spans slots in the time domain. Further, the COT 1001 may be configured or acquired for a plurality of RB-sets including the RB-sets $1002_k$. In some aspects, each of the PSSCH resources $1006_{i(k)}$ may span one or more slots. For example, in some aspects, each of the PSSCH resources $1006_{i(k)}$ may span at least two slots, as illustrated in FIGS. 9A-9B, for example. Based on receiving the wideband PSSCH communication in the RB-sets $1002_0$, $1002_1$, the receiving UE may transmit ACK/NACK for the PSSCH communication in PSSCH resources $1010_{i(k)}$ during the COT 1001. In the scheme $1000a$, the receiving UE may transmit a PSFCH waveform carrying the ACK/NACK in the PSFCH resources $1010_{i(k)}$, where the PSFCH resources $1010_{i(k)}$ occupy resources in all of the RB-sets $1002_k$ in which the PSSCH communication was transmitted. Accordingly, the receiving UE may transmit a wideband PSFCH communication occupying resources in multiple RB-sets, based on and/or in response to receiving a wideband PSSCH communication.

In some aspects, the receiving UE may perform a type 2 channel access procedure to share a portion of the COT 1001 to transmit the PSFCH waveform. In some aspects, the duration, type, and/or other parameters of the channel access procedure performed by the receiving UE may depend on a gap duration between the PSSCH communication and the PSFCH resources $1010_{i(k)}$. In another aspect, the receiving UE may perform a type 2C channel access procedure, such that the receiving UE does not perform channel sensing before transmitting the PSFCH waveform. In other aspects, the receiving UE may refrain from performing a channel access procedure before transmitting the PSFCH waveform. Following the PSFCH transmission by the receiving UE, the transmitting UE may proceed with transmission of one or more PSSCH communications in the PSSCH resources $1006_{i(k)}$. In the illustrated example, the transmitting UE may transmit the PSSCH communication in a different interlace ($1004_1$) than the interlace ($1004_0$) used to transmit the first portion of the PSSCH communication before the PSFCH communication. However, it will be understood that the transmitting UE may transmit the PSSCH communications before and after receiving the PSFCH communication using the same interlace, or any other suitable combination of interlaces. In some aspects, the transmitting UE may perform an additional type 2 channel access procedure to transmit the additional PSSCH communications. In other aspects, the transmitting UE may refrain from performing a channel access procedure. In some aspects, the transmitting UE may perform a type 2C channel access procedure.

In some aspects, the receiving UE may be configured with a plurality of PSFCH resource pools $1008_k$, where each PSFCH resource pool corresponds to a respective PSSCH RB-set $1002_k$. In some aspects, each PSFCH resource pool $1008_k$ may comprise all configured PSFCH interlaces $1005_i$ within a corresponding RB-set $1002_k$. In other aspects, each PSFCH resource pool $1008_k$ may comprise one PSFCH interlace, or a subset of the PSFCH interlaces $1005_i$ associated with a corresponding RB-set $1002_k$. For instance, the receiving UE may be configured with a same number of PSFCH resource pools as the number of RB-sets of the corresponding PSSCH communication. In this regard, the PSSCH resources $1006_{i(k)}$ may be mapped to a corresponding one of the configured PSFCH resource pools 1008. In some aspects, the PSSCH resources 1006 may be mapped to a same PSFCH interlace 1004. For example, in some aspects, the PSSCH communication may occupy a first interlace in a first RB-set, and a second interlace different from the first interlace in a second RB-set. In some aspects, the first RB-set may be a leading RB-set. In this regard, the leading RB-set may be described as the RB-set carrying the SCI-1 for the PSSCH communication. Although the PSSCH communication may occupy resources in different interlaces, the receiving UE may map the PSSCH resources to a same PSFCH interlace and in one or more of the configured RB-sets. In other aspects, the resource pools 1008 may include a plurality of interlaces in each RB-set, and the receiving UE may map the PSSCH resources 1006 to the same configured interlaces in each PSFCH resource pool.

For the purposes of the scheme $1000a$, it will be understood that the PSSCH communications before and/or after the PSFCH communication may occupy resources in one slot, or in two or more slots. In some aspects, PSCCH resources corresponding to a same interlace and a same RB-set but in different slots may be mapped to different CS pair sets, as explained above with respect to FIGS. 9A and 9B. In some aspects, a PSFCH resource pool 1008 may comprise a CS pair set in an interlace and in an RB-set. In some aspects, a PSFCH resource pool 1008 may comprise a CS pair set in one or more interlaces and in one or more RB-sets.

Referring to FIG. 10B, another scheme $1000b$ is illustrated in which a receiving UE is configured with a PSFCH resource pool 1008 spanning a plurality of RB-sets $1002_k$. The scheme $1000b$ may include aspects similar to those discussed above with respect to the scheme $1000a$. In the scheme $1000b$, the receiving UE may be configured with a PSFCH resource pool 1008 that occupies resources in three RB-sets $1002_0$, $1002_1$, $1002_2$. However, the UE may receive a PSSCH communication in only two of the RB-sets $1002_1$, $1002_2$. In some aspects, the receiving UE may map the PSSCH resources in all three of the RB-sets to the same RB-sets in the PSFCH resource pool 1008. Further, the receiving UE may be configured to transmit the PSFCH waveform in the subset of RB-sets in which the PSSCH was transmitted. Thus, although the PSFCH resource pool 1008 may occupy resources in all three of the RB sets $1002k$, the UE may transmit a truncated PSFCH waveform only in the PSFCH resources $1010_{0(1)}$, $1010_{0(2)}$ within RB-sets $1002_1$ and $1002_2$ in the illustrated example.

Referring to FIG. 10C, another scheme 1000c is Illustrated in which a receiving UE my receive an indication from the transmitting UE indicating one or more RB-sets in which to transmit a PSFCH waveform. In this regard, the receiving UE may receive a PSSCH communication in a first portion of the COT 1001 in at least one interlace and in a plurality of RB-sets 1002k. In some aspects, it may be beneficial, desirable, or otherwise advantageous to maintain the COT 1001 in only a subset of the RB-sets 1002 in which the first PSSCH communication is transmitted. Accordingly, the UE may map, based on the indication, the PSSCH resources 1006 to the indicated RB sets 1002. In the example of FIG. 10C, the transmitting UE may indicate, in SCI, the RB-sets $1002_1$ and $1002_2$, although the PSSCH occupies resources in all three RB-sets 1002. Based on the indication, the receiving UE may transmit the PSFCH waveform in the two indicated RB-sets 1002. Thus, the COT 1001 may be maintained for the two indicated RB-sets 1002 so that the transmitting UE may transmit an additional PSSCH communication after receiving the PSFCH communication.

In some aspects, the indication of the subset of RB-sets may include a bitmap indicated or carried in SCI. In other aspects, the indication may comprise a media access control (MAC) control element or information element activating the subset of RB-sets 1002. In other aspects, the indication may be an RRC message or configuration configuring the subset of RB-sets 1002. In other aspects, a combination of RRC messages, MAC-CEs, and/or SCI may be used to configure, activate, or otherwise indicate the subset of RB-sets for PSFCH mapping.

For the purposes of FIGS. 10A-10C, the receiving UE may be configured to duplicate a PSFCH waveform such that multiple instances of the PSFCH waveform are transmitted. In some instances, repeating a same waveform in multiple RB-sets may increase the PAPR for the communication. Accordingly, in some aspects, a UE transmitting PSFCH may apply different cyclic shift offsets, different root sequences, or a combination of different cyclic shift offsets and different root sequences, to different instances or duplicates of a PSFCH waveform in different RB-sets. For example, the UE transmitting the PSFCH communication may apply a different starting cyclic shift offset for a first interlaced RB (IRB) in at least one RB-set. In some aspects, cyclic shift ramping may be used for the different RBs in a RB-set. For example, the UE transmitting the PSFCH may be configured with a starting cyclic shift offset for the first IRB in a RB-set, and different starting cyclic shift offsets for RBs in the other RB-sets.

Figure 11:
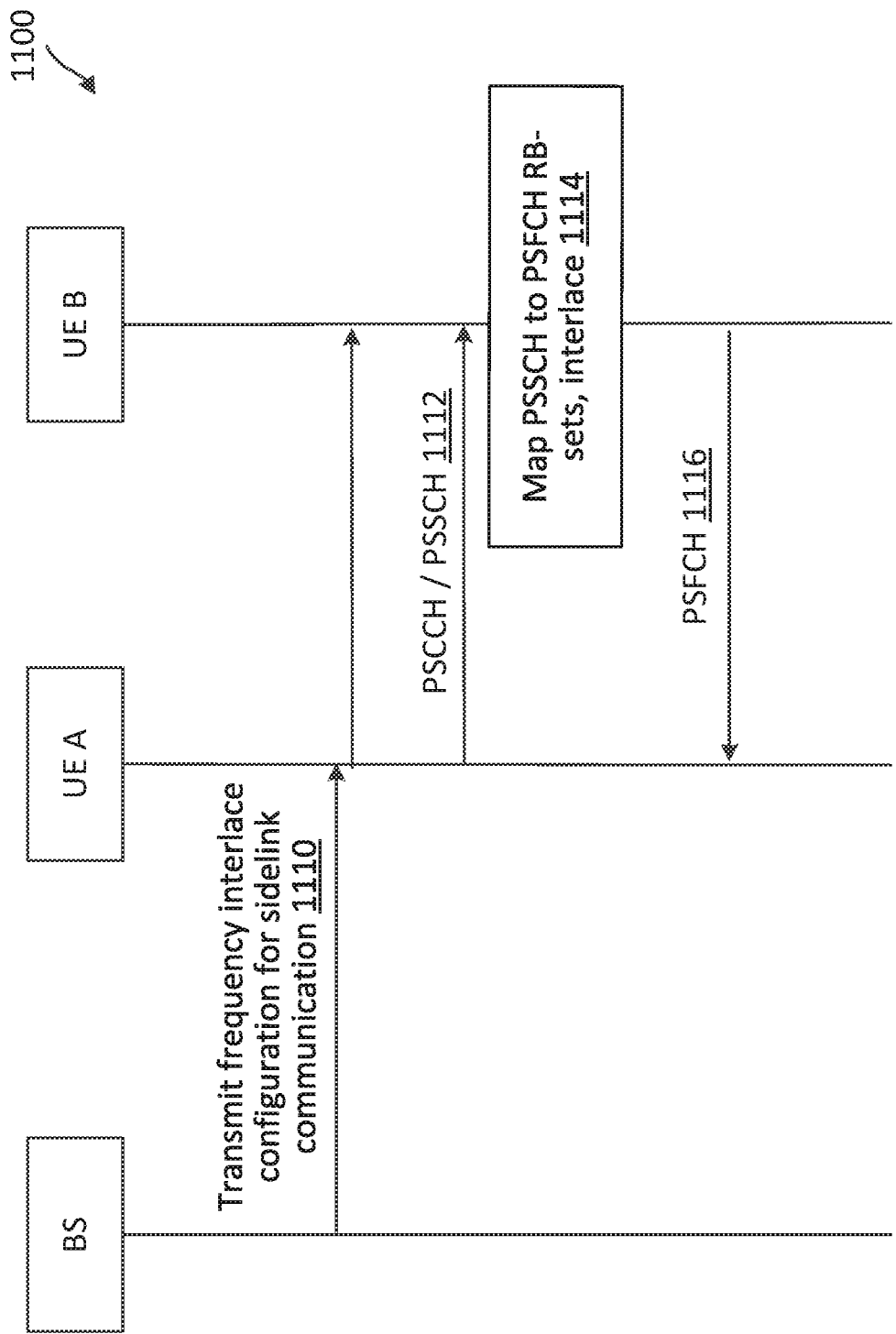
FIG. 11 is a signaling diagram of a sidelink communication method according to some aspects of the present disclosure.

FIG. 11 is a signaling diagram of a sidelink communication method 1100 according to some aspects of the present disclosure. The method 1100 may be implemented between a BS (e.g., BSs 105, 205, and/or 500) and two UEs (e.g., UEs 115, 215, and/or 400) shown as a UE A and a UE B. The method 1100 may employ similar mechanisms as in the schemes 600, 700, 800, 900, 950, 1000a-1000c, and/or 1100 described above with respect to FIGS. 6, 7, 8, 9A, 9B, 1000a, 1000b, and/or 1000c, respectively. As illustrated, the method 1100 includes a number of enumerated steps, but embodiments of the method 1100 may include additional steps before, after, and in between the enumerated steps. In some aspects, one or more of the enumerated steps may be omitted or performed in a different order.

At step 1110, the BS transmits, and UE A and UE B receive, a frequency interlace configuration for sidelink communication between the UE A and the UE B. The sidelink communications may include one or more PSSCH communications (e.g., PSSCH communications 710, 810, and/or 906), PSCCH communications (e.g., the PSCCH communications 720 and/or 820), and/or one or more PSFCH communications. The configuration may indicate a pool of frequency resources in a shared frequency band (e.g., PSFCH resource pools 1008). In some aspects, the shared frequency resources include one or more RB-sets (e.g., the RB-sets 902, 1002) and one or more PSSCH interlaces (e.g., the frequency interlaces 904, 1004). The configuration may further indicate a multiplexing configuration for multiplexing PSSCH and PSCCH communication on the same frequency interlace. The configuration may further indicate a mapping configuration or scheme for mapping PSSCH communications or resources (e.g., 1006) to PSFCH resources (e.g., 1010). For example, the configuration may indicate a mapping scheme from one or more PSSCH resources in one or more interlaces and in one or more RB-sets to one or more corresponding PSFCH resources in one or more interlaces and in the one or more RB-sets, as described above with respect to FIGS. 9A, 9B, and 10A-10C. Further, the configuration may indicate a mapping of the PSSCH communications to one or more CS pair sets in the PSFCH resources based on a slot index of the PSSCH communication, for example. In another aspect, the mapping of the PSSCH communications to CS pair sets may be based on a number of available CS pairs and a number of PSFCH interlaces, as described above with respect to FIG. 9B, for example. The configuration may further indicate a hashing configuration for hashing within a CS pair set based on at least one of a transmitting UE's ID or a groupcast ID. For example, the hashing within the CS pair set may be based on formula (3) set forth above. The configuration may further indicate that the UE A and/or the UE B may select additional frequency interlace resources from the resource pool for sidelink communication.

At step 1112, UE A transmits, and UE B receives, a PSCCH and a PSSCH communication. In some aspects, the PSCCH may include sidelink control information (SCI) indicating a grant or allocation for the PSSCH communication. In another aspect, the SCI may indicate the PSFCH resources described above. For example, the SCI may indicate one or more RB-sets, one or more PSSCH interlaces, and/or one or more PSFCH interlaces. In some aspects, the SCI may include an SCI-1. In some aspects, the PSSCH communication includes a plurality of PSSCH TBs distributed across one or more indicated RB-sets and in one or more PSSCH interlaces. Further, the PSSCH communications may be communicated over one or more slots, where each slot is associated with a slot index. In some aspects, the number of slots in which the PSSCH communications are communicated may be referred to as the PSFCH period.

In some aspects, step 1112 may comprise UE A transmitting a wideband PSCCH/PSSCH communication during a COT. As explained above, in some aspects, a wideband PSCCH/PSSCH communication may be a SL communication that occupies resources in two or more RB-sets. In one example, UE A may perform a channel access procedure to acquire a COT, and transmit the PSCCH/PSSCH communication during a first portion of the COT. In some aspects, the channel access procedure may be a type 1 channel access procedure. In some aspects, the PSCCH/PSSCH communication may comprise SCI-1 in at least a leading RB-set and a leading interlace. In some aspects, the PSCCH/PSSCH communication may indicate COT sharing information to UE B so that UE B may transmit ACK/NACK in a PSFCH occasion for the PSCCH/PSSCH communication. In some aspects, the PSCCH/PSSCH may further include or indicate scheduling information for a further PSCCH/PSSCH communication to transmit to UE B after the PSFCH occasion.

In another aspect, the PSCCH/PSSCH communication transmitted at step 1112 may comprise an indication of one or more RB-sets and/or one or more frequency interlaces of RBs for mapping PSSCH resources to PSFCH resources. In some aspects, the indication may indicate one or more PSFCH resource pools, where each PSFCH resource pool comprises resources in one or more RB-sets and one or more interlaces.

At step 1114, UE B maps the one or more PSSCH communications to the indicated PSFCH resources based on the configuration transmitted at step 1110. Accordingly, step 1114 may include one or more aspects of schemes 900, 950, 1000*a*, 1000*b*, and/or 1000*c* described above with respect to FIGS. 9A-10C. For example, in some aspects, UE B may map the PSSCH communications from one PSSCH interlace in an RB-set to a corresponding PSFCH interlace in the RB-set. In some aspects, the PSSCH communications may span more than interlace and/or more than one RB-set. Accordingly, in some aspects, step 1114 may include mapping the PSSCH communications from one set of RB-sets to a corresponding set of RB-sets of the PSFCH resources. In some aspects, the PSSCH communications may comprise wideband PSSCH communications that span a plurality of RB-sets and step 1114 may include mapping the PSSCH communications from the plurality of RB-sets to PSFCH resources within two or more RB-sets, as explained with respect to FIGS. 10A-10B. In another aspect, step 1114 may include mapping the PSSCH communications spanning the plurality of RB-sets to the same plurality of RB-sets within the PSFCH resources. In another aspect, step 1114 may include mapping the PSSCH communications from one set of PSSCH interlaces to a corresponding set of PSFCH interlaces. In some aspects, each PSSCH interlace may be associated with an interlace index and each PSFCH interlace may be associated with an interlace index. In some aspects, the indexes of the PSSCH interlaces may be the same as the indexes of the PSFCH interlaces. In other aspects, of the indexes of the PSSCH interlaces may be different from the indexes of the PSFCH interlaces. In other aspects, a single set of interlaces indexes may be used for both of the PSSCH resources and the PSFCH resources.

In some aspects, step 1114 may comprise mapping the resources in all RB-sets of the PSSCH communication to PSFCH resources in the same RB-sets. In some aspects, UE B may be configured with a plurality of PSFCH resource pools. In some aspects, each PSFCH resource pool may be associated with one RB-set of the plurality of RB-sets in which the PSCCH/PSSCH communication was transmitted. In some aspects, each PSFCH resource pool may comprise or be associated with a CS pair set in an interlace of RBs and in one RB-set. In another aspect, UE B may be configured with a PSFCH resource pool that comprises resources in a plurality of RB-sets and/or in a plurality of interlaces of RBs. In some aspects, if the PSCCH/PSSCH communication occupies resources in only a subset of the configured RB-sets of the PSFCH resource pool, UE B may be configured to map the PSSCH resources to PSFCH resources in the subset of RB-sets, and transmit a truncated PSFCH waveform in the subset. In another aspect, UE B may be configured to map the PSSCH resources to PSFCH resources based on an indication received with the PSCCH/PSSCH communication at step 1112. For example, the PSCCH/PSSCH communication may comprise SCI including a table or bitmap indicating one or more RB-sets for a PSFCH transmission. Accordingly, UE B may map PSSCH resources to only the indicated RB-sets, as illustrated in FIG. 10C, for example. Aspects of step 1114 and the mapping may comprise one or more aspects of the schemes 1000*a*, 1000*b*, and/or 1000*c* illustrated in FIGS. 10A-10C.

In one aspect, the PSSCH communications are mapped to the PSFCH resources based on the RB-set and the interlace. In another aspect, the PSSCH communications may be mapped to the PSFCH resources further based on the slot index. For example, the PSSCH communications may be mapped to one or more CS pairs in the PSFCH resources. In some aspects, the size of CS pairs in an interlace may be determined or defined based on equation (1).

In some aspects, the mapping may include a one-to-one mapping from the PSSCH interlace and slot index to the corresponding PSFCH interlace and a corresponding CS pair within the PSFCH period. In one aspect, the PSSCH leading RB-set and interlace may be the interlace and RB-set which carry or include the SCI-1 scheduling the PSSCH communication. If the PSSCH resources include the same number of RB-sets and the same number of interlaces as the PSFCH resources, the mapping may include a one-to-one mapping between the PSSCH interlace and RB-set, and the PSFCH interlace in the same RB-set. In one example, the UE B may map a leading PSSCH interlace and one or more RB-sets to a corresponding PSFCH interlace in the one or more RB-sets. In another example, the UE B may map a set of PSSCH interlaces and one or more RB-sets to a corresponding set of PSFCH interlaces in the one or more RB-sets. In another example, the UE may map a leading PSSCH interlace and a leading RB-set to a corresponding PSFCH interlace and a corresponding RB-set.

In some aspects, the number of PSFCH interlaces within an RB-set may be smaller than the number of PSSCH interlaces. The UE B may partition a total number of CS pairs in the PSFCH resources and map the PSSCH communications based on a leading PSSCH interlace to a corresponding partitioned CS pair set. In this regard, although the number of PSFCH interlaces may be smaller than or otherwise different than the number of PSSCH interlaces, the UE B may map a PSSCH leading RB-set or RB-sets to a corresponding PSFCH RB-set or RB-sets. In some aspects, the size of a partitioned CS pairs set may be determined or defined based on equation (2).

According to another aspect of the present disclosure, UE B may be configured to hash within associated CS pair sets based on UE A's identifier (ID) and/or on the groupcast ID associated with the PSSCH communication. For example, in some aspects, UE B may be configured to hash within an associated CS pair set based on UE A's L1 ID and the groupcast ID of the PSSCH communication. In some aspects, the hashing may be based on equation (3).

At step 1116, based on the mapping of action 1114, UE B transmits and UE A receives, a PSFCH communication indicating HARQ ACK/NACK feedback for each of the PSSCH communications transmitted at action 1112. In some aspects, UE B transmitting the PSFCH communication may comprise applying different cyclic shift offsets, different root sequences, or a combination of different cyclic shift offsets and different root sequences, to different instances or duplicates of a PSFCH waveform in different RB-sets. For example, UE B may apply a different starting cyclic shift offset for a first interlaced RB (IRB) in at least one RB-set. In some aspects, cyclic shift ramping may be used for the different RBs in a RB-set. For example, UE B may be configured with a starting cyclic shift offset for the first IRB in a RB-set, and different starting cyclic shift offsets for RBs in the other RB-sets.

Figure 12:
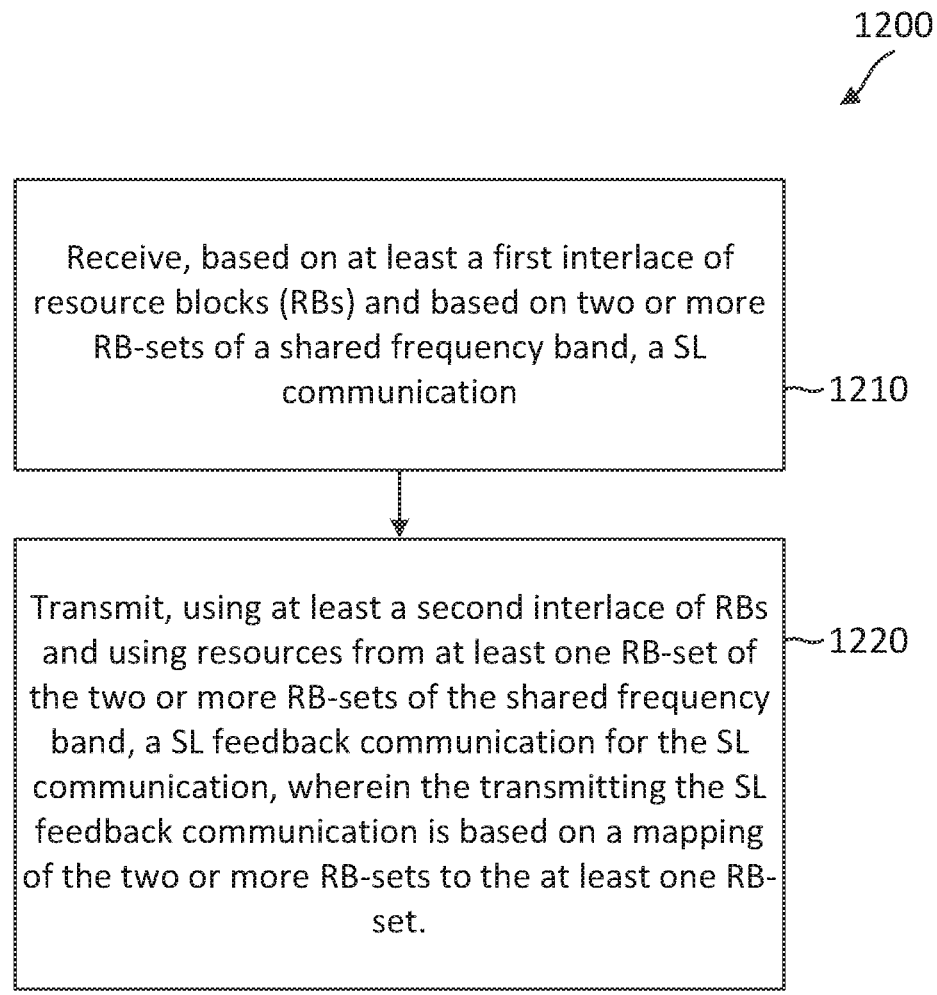
FIG. 12 is a flow diagram of a communication method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of a wireless communication device or other suitable means for performing the steps. For example, a wireless communication device, such as the UE 125, 215, or the UE 400, may utilize one or more components, such as the processor 402, the memory 404, the sidelink communication module 408, the transceiver 410, the modem 412, and the one or more antennas 416, to execute the steps of method 1200. The method 1200 may employ similar mechanisms as in the schemes 600, 700, 800, 900, 950, 1000a-1000c and/or 1100 described above with respect to FIGS. 6, 7, 8, 9A-B, 10A, 10B, 10C, and/or 11n respectively. As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1210, the method 1200 includes receiving, based on at least a first interlace of resource blocks (RBs) and based on two or more RB-sets of a shared frequency band, a SL communication. In some aspects, the SL communication comprises one or more PSCCH and/or PSSCH communications. For example, the SL communication may comprise a PSSCH communication. In some aspects, the SL communication may comprise one or more PSSCH transport blocks (TBs). In some aspects, the PSSCH communication occupies resources in the two or more RB-sets and in the at least first interlace of RBs. In some aspects, the SL communication of may be based on a SL resource pool configuration transmitted by the network via a network entity, for example. Further, the PSSCH communication may be communicated over one or more slots, where each slot is associated with a slot index. The UE 400, may utilize one or more components, such as the processor 402, the memory 404, the sidelink communication module 408, the transceiver 410, the modem 412, and the one or more antennas 416, to execute the actions of step 1210.

At step 1220, the method 1200 includes transmitting, using at least a second interlace of RBs and using resources from at least one RB-set of the two or more RB-sets of the shared frequency band, a SL feedback communication for the SL communication. In some aspects, the transmitting the SL feedback communication is based on a mapping of the two or more RB-sets to the at least one RB-set. It will be understood that the UE 400, may utilize one or more components, such as the processor 402, the memory 404, the sidelink communication module 408, the transceiver 410, the modem 412, and the one or more antennas 416, to execute the actions of step 1220.

In some aspects, step 1220 includes mapping the resources of the SL communication to SL feedback resources based on a SL resource configuration communicated by the network. For example, step 1220 may include the first UE mapping the resources of one or more PSSCH communications occupying resources in two or more RB-sets to PSFCH resources occupying resources in one or more RB-sets based on the SL resource pool configuration. Accordingly, step 1220 may include one or more aspects of the schemes 1000a, 1000b, and/or 1000c described above with respect to FIGS. 10A-10C. In this regard, transmitting the SL feedback communication may comprise transmitting a PSFCH communication. In some aspects, transmitting the PSFCH communication may comprise transmitting one or more instances of a PSFCH waveform. For example, the PSFCH waveform may be duplicated such that different instances of the PSFCH waveform occupy resources in respective RB-sets and/or in respective interlaces of RBs. The PSFCH communication may carry or indicate ACK/NACK for the SL communication received at step 1210.

In one aspect, the at least one RB-set of the two or more RB-sets may include all the RB-sets of the two or more RB-sets of the shared frequency band. For example, the SL communication may occupy resources in two or more RB-sets. In some aspects, the SL feedback communication comprises a first instance of a SL feedback waveform and a second instance of the SL feedback waveform. In some aspects, each of the first instance and the second instance occupy resources from a respective RB-set of the two or more RB-sets. In another aspect, the transmitting the SL feedback communication comprises transmitting the SL feedback communication using resources from two or more SL feedback resource pool. In another aspect, each of the SL feedback resource pools is associated with a corresponding RB-set of the two or more RB-sets. In one example, the two or more RB-sets may comprise a leading RB-set. The leading RB-set may be the RB-set of a wideband SL communication that carries or includes SCI-1. The leading RB-set may be associated with the first interlace of RBs. In some aspects, the mapping of the two or more RB-sets to the at least one RB-set may comprise a mapping of the first interlace of RBs to the second interlace of RBs for each of the two or more SL feedback resource pools.

In another aspect, the receiving the SL communication may comprise receiving the SL communication in a first slot and a second slot. A first SL feedback resource pool of the two or more SL feedback resources pools may comprise a first set of CS pairs in a first RB-set and a second SL feedback resource pool of the two or more SL feedback resource pools may comprise a second set of CS pairs in the first RB-set. The first and second sets of the CS pairs may comprise different CS pairs. As explained above, a logical interlace may comprise two or more sets of CS pairs. Each set of CS pairs may include, for example, three CS pairs, two CS pairs, four CS pairs, and/or any other suitable number of CS pairs. The mapping of the two or more RB-sets to the at least one RB-set comprises a mapping of the first slot to the first set of CS pairs and a mapping of the second slot to the second set of CS pairs. For example, the first and second sets of CS pairs may be associated with a same interlace of RBs, and PSSCH resources corresponding to a same interlace and RB-set but in different slots may be mapped to different sets of CS pairs within a corresponding PSFCH interlace. In another aspect, the mapping of the first slot to the first set of CS pairs and the mapping of the second slot to the second set of CS pairs may be based on a hashing function, as explained above. For example, the hashing function may be based on the transmitting UE's L1 ID and/or the groupcast ID of the PSSCH communication.

In another aspect, the mapping of the two or more RB-sets to the at least one RB-set may be based on a SL feedback resource pool comprising the two or more RB-sets. For example, the UE may be configured with a PSFCH resource pool including resources in two, three, four, or any other suitable number of RB-sets. The mapping may comprise a mapping of the first interlace of RBs in the two or more RB-sets to the second interlace of RBs in the two or more RB-sets. It will be understood that the second interlace of RBs may comprise the same frequency interlace as the first interlace of RBs. In other aspects, the second interlace of RBs may comprise a different frequency interlace as the first interlace of RBs. The transmitting the SL feedback communication may comprise transmitting the SL communication based on the mapping of the first interlace of RBs in the two or more RB-sets to the second interlace of RBs in the two or more RB-sets.

In another aspect, the method 1200 may further comprise receiving an indication of the at least one RB-set, where the at least one RB-set comprises fewer RB-sets than the two or more RB-sets. For example, as illustrated in FIG. 10C, the UE may receive a wideband PSSCH communication in three RB-sets. The PSSCH communication may include or be associated with an indication of the RB-sets for PSFCH transmission corresponding to the PSSCH communication. In that regard, the indication may indicate one or two RB-sets for the PSFCH transmission, although the PSSCH occupies resources in three or more RB-sets, for example. The transmitting the SL feedback communication may be based on the indication. In another aspect, the receiving the SL communication may comprise receiving the SL communication during a COT. For example, the transmitting UE transmitting the SL communication may perform a type 1 channel access procedure to acquire and initiate the COT. The SL communication may include or indicate COT sharing information for the receiving UE to share a portion of the COT to transmit the SL feedback communication. In some aspects, the receiving the indication of the at least one RB-set comprises receiving scheduling information associated with the SL communication. The scheduling information may indicate the at least one RB-set. In some aspects, the transmitting the SL feedback communication comprises transmitting the SL feedback communication during the COT, and the method further comprises receiving, during the COT and based on the at least one RB-set, a second SL communication. In some aspects, the second SL communication may comprise a further PSCCH and/or PSSCH communication. For example, the scheduling indication may indicate resources for a second PSSCH communication in the indicated at least one RB-set. The UE may map and transmit, based on the indication, PSFCH waveform(s) using resources in the indicated RB-sets in a shared portion of the COT. In some aspects, the UE may perform a type 2 channel access procedure, such as a type 2A, 2B, or 2C channel access procedure to share the portion of the COT to transmit the SL feedback communication. Further, the transmitting UE may perform an additional type 2 channel access procedure to continue the COT after the SL feedback communication to transmit the second SL communication in the COT.

In another aspect, the transmitting the SL feedback communication may comprise transmitting a first instance of an SL feedback waveform using resources from a first RB-set of the at least one RB-set, and a second instance of the SL feedback waveform using resources from a second RB-set of the at least one RB-set. In some aspects, the transmitting the first instance of the SL feedback waveform is based on a first CS offset and transmitting the second instance of the SL feedback waveform is based on a second CS offset different from the first CS offset. In another aspect, the transmitting the first instance of the SL feedback waveform is based on a first root sequence and the transmitting the second instance of the SL feedback waveform is based on a second root sequence different from the first root sequence. In a further aspect, UE may transmit the first and second instances of the SL feedback waveform using a combination of different CS offsets and different root sequences. In some aspects, using different CS offsets and/or different root sequences to transmit duplications of the SL feedback waveform may reduce or mitigate peak amplitude power ratio (PAPR) that may be higher if the SL feedback waveform instances or duplicates are transmitted using the same root sequences and/or the same CS offsets.

Further, it will be understood that the method 1200 may include or incorporate aspects of the schemes illustrated in any of FIGS. 6-10C.

Exemplary Aspects of the Disclosure

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Aspect 1. A method of wireless communication performed by a user equipment (UE), the method comprising: receiving, based on at least a first interlace of resource blocks (RBs) and based on two or more RB-sets of a shared frequency band, a SL communication; and transmitting, using at least a second interlace of RBs and using resources from at least one RB-set of the two or more RB-sets of the shared frequency band, a SL feedback communication for the SL communication, wherein the transmitting the SL feedback communication is based on a mapping of the two or more RB-sets to the at least one RB-set.

Aspect 2. The method of aspect 1, wherein the at least one RB-set of the two or more RB-sets comprises all RB-sets of the two or more RB-sets of the shared frequency band.

Aspect 3. The method of aspect 2, wherein the SL feedback communication comprises a first instance of an SL feedback waveform and a second instance of the SL feedback waveform, wherein each of the first instance and the second instance occupy resources from a respective RB-set of the two or more RB-sets.

Aspect 4. The method of any of aspects 2-3, wherein: the transmitting the SL feedback communication comprises transmitting the SL feedback communication using resources from two or more SL feedback resource pools; and each of the SL feedback resource pools is associated with a corresponding RB-set of the two or more RB-sets.

Aspect 5. The method of aspect 4, wherein: the two or more RB-sets comprise a leading RB-set; the leading RB-set is associated with the first interlace of RBs; and the mapping of the two or more RB-sets to the at least one RB-set comprises a mapping of the first interlace of RBs to the second interlace of RBs for each of the two or more SL feedback resource pools.

Aspect 6. The method of any of aspects 4-5, wherein: the receiving the SL communication comprises receiving the SL communication in a first slot and a second slot; a first SL feedback resource pool of the two or more SL feedback resource pools comprises a first set of cyclic shift (CS) pairs in a first RB-set and a second SL feedback resource pool of the two or more SL feedback resource pools comprises a second set of CS pairs in the first RB-set; the mapping of the two or more RB-sets to the at least one RB-set comprises a mapping of the first slot to the first set of CS pairs and a mapping of the second slot to the second set of CS pairs.

Aspect 7. The method of aspect 6, wherein the mapping of the first slot to the first set of CS pairs and the mapping of the second slot to the second set of CS pairs are based on a hashing function.

Aspect 8. The method of any aspects 1-3, wherein the mapping of the two or more RB-sets to the at least one RB-set: is based on a SL feedback resource pool comprising the two or more RB-sets; and comprises a mapping of the first interlace of RBs in the two or more RB-sets to the second interlace of RBs in the two or more RB-sets, and wherein the transmitting the SL feedback communication comprises transmitting the SL communication based on the mapping of the first interlace of RBs in the two or more RB-sets to the second interlace of RBs in the two or more RB-sets.

Aspect 9. The method of any of aspects 1-8, further comprising: receiving an indication of the at least one RB-set, wherein the at least one RB-set comprises fewer RB-sets than the two or more RB-sets, wherein the transmitting the SL feedback communication is based on the indication.

Aspect 10. The method of aspect 9, wherein: the receiving the SL communication comprises receiving the SL communication during a channel occupancy time (COT); the receiving the indication of the at least one RB-set comprises receiving scheduling information associated with the SL communication, the scheduling information indicating the at least one RB-set; the transmitting the SL feedback communication comprises transmitting the SL feedback communication during the COT; and the method further comprises: receiving, during the COT and based on the at least one RB-set, a second SL communication.

Aspect 11. The method of any of aspects 1-10, wherein: the transmitting the SL feedback communication comprises transmitting: a first instance of an SL feedback waveform using resources from a first RB-set of the at least one RB-set; and a second instance of the SL feedback waveform using resources from a second RB-set of the at least one RB-set.

Aspect 12. The method of aspect 11, wherein: the transmitting the first instance of the SL feedback waveform is based on a first cyclic shift (CS) offset and the transmitting the second instance of the SL feedback waveform is based on a second CS offset different from the first CS offset; the transmitting the first instance of the SL feedback waveform is based on a first root sequence and the transmitting the second instance of the SL feedback waveform is based on a second root sequence different from the first root sequence; or a combination thereof.

Aspect 13. A user equipment (UE) comprising: a memory device; a transceiver; and a processor in communication with the memory device and the transceiver, wherein the UE is configured to perform the steps of any of aspects 1-12.

Aspect 14. A non-transitory, computer-readable medium having program code recorded thereon, wherein the program code comprises instructions executable by a processor of a UE to cause the UE to perform the steps of any of aspects 1-12.

Aspect 15. A UE comprising means for performing the steps of any of aspects 1-12.

Aspect 16. A method of wireless communication performed by a user equipment (UE), the method comprising: transmitting, based on at least a first interlace of resource blocks (RBs) and based on two or more RB-sets of a shared frequency band, a SL communication; and receiving, based on at least a second interlace of RBs and using resources from at least one RB-set of the two or more RB-sets of the shared frequency band, a SL feedback communication for the SL communication, wherein the receiving the SL feedback communication is based on a mapping of the two or more RB-sets to the at least one RB-set.

Aspect 17. The method of aspect 16, wherein the at least one RB-set of the two or more RB-sets comprises all RB-sets of the two or more RB-sets of the shared frequency band.

Aspect 18. The method of aspect 17, wherein the SL feedback communication comprises a first instance of an SL feedback waveform and a second instance of the SL feedback waveform, wherein each of the first instance and the second instance occupy resources from a respective RB-set of the two or more RB-sets.

Aspect 19. The method of any of aspects 17-18, wherein: the receiving the SL feedback communication comprises receiving the SL feedback communication using resources from two or more SL feedback resource pools; and each of the SL feedback resource pools is associated with a corresponding RB-set of the two or more RB-sets.

Aspect 20. The method of aspect 19, wherein: the two or more RB-sets comprise a leading RB-set; the leading RB-set is associated with the first interlace of RBs; and the mapping of the two or more RB-sets to the at least one RB-set comprises a mapping of the first interlace of RBs to the second interlace of RBs for each of the two or more SL feedback resource pools.

Aspect 21. The method of any of aspects 19-20, wherein: the transmitting the SL communication comprises transmitting the SL communication in a first slot and a second slot; a first SL feedback resource pool of the two or more SL feedback resource pools comprises a first set of cyclic shift (CS) pairs in a first RB-set and a second SL feedback resource pool of the two or more SL feedback resource pools comprises a second set of CS pairs in the first RB-set; the mapping of the two or more RB-sets to the at least one RB-set comprises a mapping of the first slot to the first set of CS pairs and a mapping of the second slot to the second set of CS pairs.

Aspect 22. The method of aspect 21, wherein the mapping of the first slot to the first set of CS pairs and the mapping of the second slot to the second set of CS pairs are based on a hashing function.

Aspect 23. The method of any aspects 16-18, wherein the mapping of the two or more RB-sets to the at least one RB-set: is based on a SL feedback resource pool comprising the two or more RB-sets; and comprises a mapping of the first interlace of RBs in the two or more RB-sets to the second interlace of RBs in the two or more RB-sets, and wherein the receiving the SL feedback communication comprises receiving the SL communication based on the mapping of the first interlace of RBs in the two or more RB-sets to the second interlace of RBs in the two or more RB-sets.

Aspect 24. The method of any of aspects 16-23, further comprising: transmitting an indication of the at least one RB-set, wherein the at least one RB-set comprises fewer RB-sets than the two or more RB-sets, wherein the receiving the SL feedback communication is based on the indication.

Aspect 25. The method of aspect 24, wherein: the transmitting the SL communication comprises transmitting the SL communication during a channel occupancy time (COT); the transmitting the indication of the at least one RB-set comprises transmitting scheduling information associated with the SL communication, the scheduling information indicating the at least one RB-set; the receiving the SL feedback communication comprises transmitting the SL feedback communication during the COT; and the method further comprises: transmitting, during the COT and based on the at least one RB-set, a second SL communication.

Aspect 26. The method of any of aspects 16-25, wherein: the receiving the SL feedback communication comprises receiving: a first instance of an SL feedback waveform using resources from a first RB-set of the at least one RB-set; and a second instance of the SL feedback waveform using resources from a second RB-set of the at least one RB-set.

Aspect 27. The method of aspect 26, wherein: the receiving the first instance of the SL feedback waveform is based on a first cyclic shift (CS) offset and the transmitting the second instance of the SL feedback waveform is based on a second CS offset different from the first CS offset; the receiving the first instance of the SL feedback waveform is based on a first root sequence and the transmitting the second instance of the SL feedback waveform is based on a second root sequence different from the first root sequence; or a combination thereof.

Aspect 28. A user equipment (UE) comprising: a memory device; a transceiver; and a processor in communication with the memory device and the transceiver, wherein the UE is configured to perform the steps of any of aspects 16-27.

Aspect 29. A non-transitory, computer-readable medium having program code recorded thereon, wherein the program code comprises instructions executable by a processor of a UE to cause the UE to perform the steps of any of aspects 16-27.

Aspect 30. A UE comprising means for performing the steps of any of aspects 16-27.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    receiving, using a first set of frequency resources comprising at least a first interlace of resource blocks (RBs) in a plurality of RB-sets of a shared frequency band, a sidelink (SL) data communication; and
    transmitting, using a second set of frequency resources comprising at least a second interlace of RBs in two or more RB-sets of the plurality of RB-sets of the shared frequency band, a SL feedback communication for the SL data communication,
    wherein the transmitting the SL feedback communication is based on a mapping of the plurality of RB-sets to the two or more RB-sets, wherein the first set of frequency resources is different from the second set of frequency resources,
    wherein the mapping of the plurality of RB-sets to the two or more RB-sets comprises a mapping of a first slot to the first set of cyclic shift (CS) pairs and a mapping of a second slot to the second set of CS pairs, and
    wherein the mapping of the first slot to the first set of CS pairs and the mapping of the second slot to the second set of CS pairs are based on a hashing function.

2. The method of claim 1, wherein the two or more RB-sets of the a plurality of RB-sets comprises all RB-sets of the a plurality of RB-sets of the shared frequency band.

3. The method of claim 2, wherein the SL feedback communication comprises a first instance of an SL feedback waveform and a second instance of the SL feedback waveform, wherein each of the first instance and the second instance occupy resources from a respective RB-set of the plurality of RB-sets.

4. The method of claim 2, wherein:
    the transmitting the SL feedback communication comprises transmitting the SL feedback communication using resources from two or more SL feedback resource pools; and
    each of the SL feedback resource pools is associated with a corresponding RB-set of the plurality of RB-sets.

5. The method of claim 4, wherein:
    the plurality of RB-sets comprise a leading RB-set;
    the leading RB-set is associated with the first interlace of RBs; and
    the mapping of the plurality of RB-sets to the two or more RB-sets comprises a mapping of the first interlace of RBs to the second interlace of RBs for each of the two or more SL feedback resource pools.

6. The method of claim 4, wherein:
    the receiving the SL data communication comprises receiving the SL data communication in the first slot and the second slot; and a first SL feedback resource pool of the two or more SL feedback resource pools comprises a first set of cyclic shift (CS) pairs in the first RB-set and a second SL feedback resource pool of the two or more SL feedback resource pools comprises a second set of CS pairs in the first RB-set.

7. The method of claim 1, wherein the mapping of the plurality of RB-sets to the two or more RB-sets:
is based on a SL feedback resource pool comprising the plurality of RB-sets; and
comprises a mapping of the first interlace of RBs in the plurality of RB-sets to the second interlace of RBs in the plurality of RB-sets, and
wherein the transmitting the SL feedback communication comprises transmitting the SL data communication based on the mapping of the first interlace of RBs in the plurality of RB-sets to the second interlace of RBs in the plurality of RB-sets.

8. The method of claim 1, further comprising:
receiving an indication of the two or more RB-sets, wherein the two or more RB-sets comprises fewer RB-sets than the plurality of RB-sets,
wherein the transmitting the SL feedback communication is based on the indication.

9. The method of claim 8, wherein:
the receiving the SL data communication comprises receiving the SL data communication during a channel occupancy time (COT);
the receiving the indication of the two or more RB-sets comprises receiving scheduling information associated with the SL data communication, the scheduling information indicating the two or more RB-sets;
the transmitting the SL feedback communication comprises transmitting the SL feedback communication during the COT; and
the method further comprises:
receiving, during the COT and based on the two or more RB-sets, a second SL data communication.

10. The method of claim 1, wherein:
the transmitting the SL feedback communication comprises transmitting:
a first instance of an SL feedback waveform using resources from the first RB-set of the two or more RB-sets; and
a second instance of the SL feedback waveform using resources from the second RB-set of the two or more RB-sets.

11. The method of claim 10, wherein:
the transmitting the first instance of the SL feedback waveform is based on a first cyclic shift (CS) offset and the transmitting the second instance of the SL feedback waveform is based on a second CS offset different from the first CS offset;
the transmitting the first instance of the SL feedback waveform is based on a first root sequence and the transmitting the second instance of the SL feedback waveform is based on a second root sequence different from the first root sequence; or
a combination thereof.

12. A user equipment (UE), comprising:
a memory device;
a transceiver; and
a processor in communication with the memory device and the transceiver, wherein the UE is configured to:
receive, using a first set of frequency resources comprising at least a first interlace of resource blocks (RBs) in a plurality of RB-sets of a shared frequency band, a sidelink (SL) data communication; and
transmit, using a second set of frequency resources comprising at least a second interlace of RBs in two or more RB-sets of the plurality of RB-sets of the shared frequency band, a SL feedback communication for the SL data communication,
wherein the UE configured to transmit the SL feedback communication is based on a mapping of the plurality of RB-sets to the two or more RB-sets, wherein the first set of frequency resources is different from the second set of frequency resources,
wherein the mapping of the plurality of RB-sets to the two or more RB-sets comprises a mapping of a first slot to the first set of cyclic shift (CS) pairs and a mapping of a second slot to the second set of CS pairs, and
wherein the mapping of the first slot to the first set of CS pairs and the mapping of the second slot to the second set of CS pairs are based on a hashing function.

13. The UE of claim 12, wherein the two or more RB-sets of the plurality of RB-sets comprises all RB-sets of the plurality of RB-sets of the shared frequency band.

14. The UE of claim 13, wherein the SL feedback communication comprises a first instance of an SL feedback waveform and a second instance of the SL feedback waveform, wherein each of the first instance and the second instance occupy resources from a respective RB-set of the plurality of RB-sets.

15. The UE of claim 13, wherein:
the UE configured to transmit the SL feedback communication comprises the UE configured to transmit the SL feedback communication using resources from two or more SL feedback resource pools; and
each of the SL feedback resource pools is associated with a corresponding RB-set of the plurality of RB-sets.

16. The UE of claim 15, wherein:
the plurality of RB-sets comprise a leading RB-set;
the leading RB-set is associated with the first interlace of RBs; and
the mapping of the plurality of RB-sets to the two or more RB-sets comprises a mapping of the first interlace of RBs to the second interlace of RBs for each of the two or more SL feedback resource pools.

17. The UE of claim 15, wherein:
the UE is configured to receive the SL data communication in the first slot and the second slot;
a first SL feedback resource pool of the two or more SL feedback resource pools comprises a first set of cyclic shift (CS) pairs in the first RB-set and a second SL feedback resource pool of the two or more SL feedback resource pools comprises a second set of CS pairs in the first RB-set.

18. The UE of claim 17, wherein the mapping of the first slot to the first set of CS pairs and the mapping of the second slot to the second set of CS pairs are based on a hashing function.

19. The UE of claim 12, wherein the mapping of the plurality of RB-sets to the two or more RB-sets:
is based on a SL feedback resource pool comprising the plurality of RB-sets; and
comprises a mapping of the first interlace of RBs in the plurality of RB-sets to the second interlace of RBs in the plurality of RB-sets, and
wherein the UE is configured to transmit the SL feedback communication based on the mapping of the first interlace of RBs in the plurality of RB-sets to the second interlace of RBs in the plurality of RB-sets.

20. The UE of claim 12, wherein the UE is further configured to:
receive an indication of the two or more RB-sets, wherein the two or more RB-sets comprises fewer RB-sets than the plurality of RB-sets,
wherein the UE is configured to transmit the SL feedback communication based on the indication.

21. The UE of claim 20, wherein:
the UE configured to receive the SL data communication comprises the UE configured to receive the SL data communication during a channel occupancy time (COT);
the UE configured to receive the indication of the two or more RB-sets comprises the UE configured to receive scheduling information associated with the SL data communication, the scheduling information indicating the two or more RB-sets;
the UE configured to transmit the SL feedback communication comprises the UE configured to transmit the SL feedback communication during the COT; and
the UE is further configured to:
receive, during the COT and based on the two or more RB-sets, a second SL data communication.

22. The UE of claim 12, wherein:
the UE configured to transmit the SL feedback communication comprises the UE configured to transmit:
a first instance of an SL feedback waveform using resources from the first RB-set of the two or more RB-sets; and
a second instance of the SL feedback waveform using resources from the second RB-set of the two or more RB-sets.

23. The UE of claim 22, wherein:
the UE is configured to transmit the first instance of the SL feedback waveform is based on a first cyclic shift (CS) offset and the transmitting the second instance of the SL feedback waveform is based on a second CS offset different from the first CS offset;
the UE is configured to transmit the first instance of the SL feedback waveform is based on a first root sequence and the transmitting the second instance of the SL feedback waveform is based on a second root sequence different from the first root sequence; or
a combination thereof.

24. A user equipment (UE), comprising:
means for receiving, using a first set of frequency resources comprising at least a first interlace of resource blocks (RBs) in a plurality of RB-sets of a shared frequency band, a sidelink (SL) data communication; and
means for transmitting, using a second set of frequency resources comprising at least a second interlace of RBs in two or more RB-sets of the plurality of RB-sets of the shared frequency band, a SL feedback communication for the SL data communication,
wherein the means for transmitting the SL feedback communication is based on a mapping of the plurality of RB-sets to the two or more RB-sets, wherein the first set of frequency resources is different from the second set of frequency resources,
wherein the mapping of the plurality of RB-sets to the two or more RB-sets comprises a mapping of a first slot to the first set of cyclic shift (CS) pairs and a mapping of a second slot to the second set of CS pairs, and
wherein the mapping of the first slot to the first set of CS pairs and the mapping of the second slot to the second set of CS pairs are based on a hashing function.

* * * * *